United States Patent
Guo et al.

(10) Patent No.: US 12,451,989 B2
(45) Date of Patent: Oct. 21, 2025

(54) METHOD FOR A TRANSPORT BLOCK SIZE DETERMINATION PROCEDURE

(71) Applicant: ZTE CORPORATION, Guangdong (CN)

(72) Inventors: Qiujin Guo, Shenzhen (CN); Jun Xu, Shenzhen (CN); Mengzhu Chen, Shenzhen (CN); Xiaoying Ma, Shenzhen (CN); Qiang Fu, Shenzhen (CN); Jian Kang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 459 days.

(21) Appl. No.: 17/816,150

(22) Filed: Jul. 29, 2022

(65) Prior Publication Data
US 2023/0058672 A1 Feb. 23, 2023

Related U.S. Application Data

(63) Continuation of application No. PCT/CN2020/109285, filed on Aug. 14, 2020.

(51) Int. Cl.
*H04L 1/00* (2006.01)
*H04W 72/23* (2023.01)

(52) U.S. Cl.
CPC ........... *H04L 1/0007* (2013.01); *H04W 72/23* (2023.01)

(58) Field of Classification Search
CPC ... H04L 1/0007; H04L 1/0009; H04L 1/0003; H04L 1/0026; H04L 1/1854; H04L 1/1887; H04W 72/23; H04W 52/0216; H04W 52/0219
See application file for complete search history.

(56) References Cited

U.S. PATENT DOCUMENTS

| | | | |
|---|---|---|---|
| 2019/0230699 A1 | 7/2019 | Davydov et al. | |
| 2020/0092033 A1 | 3/2020 | Lyu | |
| 2020/0128529 A1* | 4/2020 | Wang | H04L 5/0091 |
| 2021/0045145 A1* | 2/2021 | Yoshimura | H04W 72/1268 |

FOREIGN PATENT DOCUMENTS

| | | |
|---|---|---|
| CN | 107925921 A | 4/2018 |
| CN | 108886711 A | 11/2018 |
| CN | 109076389 A | 12/2018 |
| CN | 109120375 A | 1/2019 |

(Continued)

OTHER PUBLICATIONS

First Office Action for CN Appl. No. 2020801039248, dated Apr. 7, 2024 (with English translation, 20 pages).

(Continued)

*Primary Examiner* — Ayanah S George
(74) *Attorney, Agent, or Firm* — Foley & Lardner LLP

(57) ABSTRACT

A wireless communication method for use in a wireless terminal is disclosed. The wireless communication method comprises determining an intermediate transport block size (TBS) for a transport block transmitted between the wireless terminal and a wireless network node based on a plurality of transmission parameters, modifying the intermediate TBS to generate a modified TBS in response to at least one event, and determining a final TBS based on the modified TBS and a specific step in response to the at least one event, wherein the specific step is determined based on the plurality of transmission parameters.

18 Claims, 3 Drawing Sheets

(56) References Cited

FOREIGN PATENT DOCUMENTS

| CN | 109565361 A | 4/2019 |
|---|---|---|
| CN | 111373710 A | 7/2020 |
| CN | 111436144 A | 7/2020 |
| WO | WO-2018/203818 A1 | 11/2018 |
| WO | WO-2019/069147 A1 | 4/2019 |
| WO | WO-2019/095315 A1 | 5/2019 |
| WO | WO-2019/191973 A1 | 10/2019 |

OTHER PUBLICATIONS

ETSI, "5G;NR;Physical layer procedures for data" 3GPP TS 38.214, 16.2.0, Release 16, Jul. 30, 2020 (167 pages).
International Search Report and Written Opinion for PCT Appl. No. PCT/CN2020/109285, mailed Apr. 29, 2021 (9 pages).
Extended European Search Report for EP Appl. No. 20949157.0, dated Aug. 22, 2023 (8 pages).
Interdigital Inc., "On TB Size Design", 3GPP TSG RAN WGI1 Meeting 91, R1-1720643, Dec. 1, 2017, Reno, USA (3 pages).
Spreadtrum Communications, "Tbs calculation for small packet sizes", 3GPP Tsg Ran WG1 Meeting AH 1801, R1-1800276, Jan. 26, 2018, Vancouver, Canada (9 pages).

* cited by examiner

METHOD FOR A TRANSPORT BLOCK SIZE DETERMINATION PROCEDURE

CROSS-REFERENCE TO RELATED APPLICATION

This application claims the benefit of priority under 35 U.S.C. § 120 as a continuation of PCT Patent Application No. PCT/CN2020/109285, filed on Aug. 14, 2020, the disclosure of which is incorporated herein by reference in its entirety.

TECHNICAL FIELD

This document is directed generally to wireless communications.

SUMMARY

In existing long term evolution (LTE) and 5G new radio (NR) access technology communication systems, the user equipment (UE) determines the transport block size (TBS) of scheduling data for physical uplink shared channel (PUSCH) and physical downlink shared channel (PDSCH). The value of parameters used to determine TBS is determined by the information elements configured by higher layer parameter and indicated by downlink control information (DCI) transmitted by means of different DCI formats with the cyclic redundancy check (CRC) scrambled by specific radio network temporary identifiers (RNTIs), such as C-RNTI (cell RNTI), CS-RNTI (configured scheduling RNTI), MCS-C-RNTI (modulation and coding scheme cell RNTI), TC-RNTI (temporary cell RNTI), SI-RNTI (system information RNTI), etc., in physical downlink control channel (PDCCH).

The parameters used to determine TBS include the number of subcarriers in a physical resource block (PRB), and the number of symbols of the PDSCH or PUSCH allocation within the slot, the total number of PRBs ($n_{PRB}$) allocated for the UE, the number of resource elements (REs) for reference signal (RS) per PRB, the number of overhead configured by higher layer parameter, the code rate (R) and modulation order ($Q_m$) determined by the $I_{MCS}$ and the configured MCS table, and the number of MIMO (multi-input multi-output) layers. The UE may use the following steps to determine the final TBS:

In a first step, the UE determines the total number of REs allocated for PDSCH or PUSCH ($N_{RE}$) based on the number of allocated PRBs, the number of REs for DM-RS (demodulation RS) per PRB, the number of overhead per PRB, the number of subcarriers in a PRB, and the number of symbols of the PDSCH allocation within the slot.

In a second step, an intermediate number of information bits ($N_{info}$) is obtained by $N_{info}=N_{RE} \cdot R \cdot Q_m \cdot \upsilon$. Then if $N_{info} \leq 3824$, a third step is used as the next step of the TBS determination, otherwise, a fourth step is used as the next step of the TBS determination.

In the third step, when $N_{info} \leq 3824$, TBS is determined as follows:

quantized intermediate number of information bits $$N'_{info} = \max\left(24, 2^n \cdot \left\lfloor \frac{N_{info}}{2^n} \right\rfloor\right),$$

where $n = \max(3, \lfloor \log_2(N_{info}) \rfloor - 6)$.

use Table 1 below to find the closest TBS that is not less than $N'_{info}$.

TABLE 1

| \multicolumn{2}{c}{TBS for $N_{info} \leq 3824$} | |
|---|---|
| Index | TBS |
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |

TABLE 1-continued

TBS for $N_{info} \leq 3824$

| Index | TBS |
|---|---|
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

In the fourth step, when $N_{info} > 3824$, TBS is determined as follows quantized intermediate number of information bits $$N'_{info} = \max\left(3840, 2^n \times \text{round}\left(\frac{N_{info} - 24}{2^n}\right)\right),$$

where $n = \lfloor \log_2(N_{info} - 24) \rfloor - 5$ and the round function represents the input number to the closest integer.

- if $R \leq 1/4$ $$TBS = 8 \cdot C \cdot \left\lceil \frac{N'_{info} + 24}{8 \cdot C} \right\rceil - 24, \text{ where } C = \left\lceil \frac{N'_{info} + 24}{3816} \right\rceil$$

else
if $N_{info}' > 8424$ $$TBS = 8 \cdot C \cdot \left\lceil \frac{N'_{info} + 24}{8 \cdot C} \right\rceil - 24, \text{ where } C = \left\lceil \frac{N'_{info} + 24}{8424} \right\rceil$$

else $$TBS = 8 \cdot \left\lceil \frac{N'_{info} + 24}{8} \right\rceil - 24$$

end if
end if.

The MCS tables associated with the data scheduling for PUSCH includes two types of MCS table. If the transform precoding is disabled by the higher layer parameters, the MCS tables available for data transmission in PDSCH can be used for PUSCH. If the transform precoding is enabled by the higher layer parameters, the MCS tables for PUSCH with transform precoding may be used. The transform precoding is associated with the DFT-s-OFDM waveform.

This document relates to methods, systems, and devices for a transport block size determination procedure.

The present disclosure relates to a wireless communication method for use in a wireless terminal. The wireless communication method comprises:
 determining an intermediate transport block size (TBS) for a transport block transmitted between the wireless terminal and a wireless network node based on a plurality of transmission parameters,
 modifying the intermediate TBS to generate a modified TBS in response to at least one event, and
 determining a final TBS based on the modified TBS and a specific step in response to the at least one event, and
 wherein the specific step is determined based on the plurality of transmission parameters.

Various embodiments may preferably implement the following features:

Preferably, the plurality of transmission parameters comprises at least one of a downlink control information (DCI) format, a type of a transmission mode configured for the wireless terminal, a type of a frequency range, a type of a radio network temporary identifier (RNTI) scrambling a cyclic redundancy check (CRC) of DCI, the number of physical resource blocks (PRBs) used to determine intermediate TBS, the modulation and coding scheme (MCS) index used to determine the code rate and modulation order, a coverage capability of the wireless terminal, the value of sub-carrier spacing, or a value of an average orthogonal frequency-division multiplexing (OFDM) symbol duration.

Preferably, the transmission mode is determined based on one of a user equipment (UE) capability and a UE category.

Preferably, the number of physical resource blocks is smaller than or equal to the maximum number of PRBs, wherein the maximum number of PRBs is determined based on at least one of the maximum bandwidth supported by the wireless terminal, the maximum symbols per slot used for data scheduling, and the type of the transmission mode of the wireless terminal.

Preferably, the number of physical resource blocks is smaller than or equal to the maximum number of PRBs, wherein the maximum number of PRBs is determined based on at least one of the maximum bandwidth supported by the wireless terminal, the maximum symbols per slot used for data scheduling, and the type of the transmission mode of the wireless terminal.

Preferably, the type of the transmission mode of the wireless terminal is associated with at least one of the maximum bandwidth supported by the wireless terminal, the minimum bandwidth supported by the wireless terminal, the maximum number of layers supported by the wireless terminal, the maximum number of antenna ports for transmitting the signal, a peak data rate for uplink and/or downlink supported by the wireless terminal, a battery life of the wireless terminal, a modulation order supported by the wireless terminal, the maximum code rate supported by the wireless terminal, the maximum TBS supported by the wireless terminal, the maximum number of physical resource blocks associated with a bandwidth supported by the wireless terminal, a target block error rate of transmitting the signal, an end-to-end latency supported by the wireless terminal, the number of frequency range FR types supported by the wireless terminal, a coverage enhancement capability of the wireless terminal, a power class of the wireless terminal, a processing time capability of the wireless terminal, a type of use case of the wireless terminal, wherein the use case comprises at least one of an industrial wireless sensor, a video surveillance or a wearable device, or a duplex mode of the wireless terminal.

Preferably, the final TBS is smaller than or equal to the maximum TBS.

Preferably, the maximum TBS is determined based on the plurality of transmission parameters.

Preferably, the plurality of transmission parameters includes at least one of the maximum code block size, the maximum code rate supported by the wireless terminal, the maximum code rate of MCS table, the maximum modulation order supported by the wireless terminal and the maximum modulation order of the MCS table.

Preferably, the maximum TBS is one of elements in a TBS table which is greater than or equal to the product of the maximum code block size and a ratio of the maximum code rate supported by the wireless terminal and the maximum code rate in a configurable modulation and coding scheme (MCS) table, the ratio of the maximum code rate supported by the wireless terminal and the maximum code rate in the configurable MCS table is a value in a range [0.27, 0.7201], and the maximum code block size is equal to 3840 for low-density parity-check (LDPC) base graph 2 and is 8448 for LDPC base graph 1.

Preferably, the maximum TBS is one of elements in a TBS table which is greater than or equal to a product of the maximum code block size and a ratio of the maximum modulation order supported by the wireless terminal and the maximum modulation order in a configurable MCS table, the ratio of the maximum modulation order supported by the wireless terminal and the maximum modulation order in the configurable MCS table is a value in a range [0.25, 1], and the maximum code block size is equal to 3840 for LDPC base graph 2 and 8448 for LDPC base graph 1.

Preferably, the maximum TBS for a first type of a transmission mode comprises at least one element in a first TBS set and the maximum TBS for a second type of the transmission mode comprises at least one element in a second TBS set.

Preferably, the transport block is transmitted in a physical downlink shared channel, and the first TBS set comprises at least one of {1000, 1736, 3752, 3824, 3840, 4008, 5160, 8424, 27376, 51240}.

Preferably, the transport block is transmitted in a physical uplink shared channel, and the first TBS set comprises at least one of {328, 408, 456, 504, 600, 712, 808, 936, 1000, 1736, 3752, 3824, 3840, 4008, 5160, 8424}.

Preferably, the transport block is transmitted in a physical downlink shared channel, and the second TBS set comprises at least one of {8424, 15110, 15370, 15620, 15880, 16140, 27376, 50180, 51220}.

Preferably, the transport block is transmitted in a physical uplink shared channel, and the second TBS set comprises at least one of {3824, 5160, 8424, 25100, 27376}.

Preferably, a value of any element in the first TBS set is smaller than or equal to 5160 and a value of any element in the second TBS set is smaller than or equal to 8848.

Preferably, a value of any element in the first TBS set is smaller than or equal to 3840 and a value of any element in the second TBS set is smaller than or equal to 3840.

Preferably, the wireless terminal supports LDPC base graph 2, and the intermediate TBS or the final TBS is smaller than or equal to 3824.

Preferably, the at least one event comprises at least one of the intermediate TBS is greater than 3824, the wireless terminal supports LDPC based graph 2, the type of RNTI scrambling the CRC of the DCI is an RNTI other than the RNTI in Rel-16 NR, or the type of transmission mode is a first type of transmission mode including the maximum modulation order smaller than or equal to 64 quadrature amplitude modulation (QAM).

Preferably, the specific step comprises using a TBS table to determine the closest TBS that is greater than or equal to the modified TBS.

Preferably, each element in the TBS table is different from all of the elements in TBS table in Rel-16 NR.

Preferably, each element in the TBS table is divisible by 3816 and a quotient of the element divided by 3816 is larger than 1.

Preferably, the final TBS is determined by:

$$\text{final } TBS = 8 \cdot C \left\lceil \frac{N'_{info} + 24}{8 \cdot C} \right\rceil,$$

wherein C is determined by $$\left\lceil \frac{N'_{info} + 24}{3816} \right\rceil,$$

wherein $\lceil \ \rceil$ is a ceiling function, $N'_{info}$ is the modified TBS and is determined by:

$$N'_{info} = \max\left(3840, 2^n \times \text{round}\left(\frac{N_{info} - 24}{2^n}\right)\right),$$

wherein max( ) is a function of acquiring the maximum variable, round ( ) is a function of rounding a variable to the closest integer, $N_{info}$ is the intermediate TBS and n is determined by:

$$n = \lfloor \log_2(N_{info} - 24) \rfloor - 5,$$

wherein $\lfloor \ \rfloor$ is a bottom function.

Preferably, the number of physical resource blocks in the signal is quantized by a scaling factor which is associated with a bandwidth of a bandwidth part of the wireless terminal.

Preferably, a MCS table with transform precoding is used for transmitting the transport block, and the wireless terminal is configured with a type of transmission mode which is associated with at least one of a type of a radio network temporary identifier scrambling a cyclic redundancy check of downlink control information, a peak data rate for uplink and/or downlink, a battery life of the wireless terminal, a modulation order supported by the wireless terminal, the maximum code rate, the maximum TBS supported by the wireless terminal, the maximum number of physical resource blocks associated with a bandwidth configured for of a bandwidth part of the wireless terminal, a target block error rate of transmitting the transport block, an end-to-end latency supported by the wireless terminal, the type of frequency range supported by the wireless terminal, a coverage enhancement capability of the wireless terminal, a power class of the wireless terminal, a processing time capability of the wireless terminal, a use case of the wireless terminal, wherein the use case comprises at least one of an industrial wireless sensor, a video surveillance or a wearable device, or a duplex mode supported by the wireless terminal.

Preferably, a buffer size for LDPC rate matching is determined by a higher layer signaling comprising at least one of the maximum bandwidth supported by the wireless terminal, the number of physical resource blocks available for the wireless terminal in a bandwidth supported by the wireless terminal, the maximum number of layers supported by the wireless terminal, a peak data rate supported by the wireless terminal, the maximum modulation order supported by the wireless terminal, a bandwidth part activated for the wireless terminal, or a type of a radio network temporary identifier scrambling cyclic redundancy check of downlink control information.

The present disclosure relates to a wireless communication method for use in a wireless network node. The wireless communication method comprises:

transmitting, to a wireless terminal, a signal comprising a plurality of transmission parameters;

determining an intermediate transport block size (TBS) for a transport block transmitted between the wireless terminal and the wireless network node based on the plurality of transmission parameters, modifying the intermediate TBS to generate a modified TBS in response to at least one event, and determining a final TBS based on the modified TBS and a specific step in response to the at least one event, wherein the specific step is determined based on the plurality of transmission parameters.

Various embodiments may preferably implement the following features:

Preferably, the plurality of transmission parameters comprises at least one of a downlink control information (DCI) format, a type of a transmission mode configured for the wireless terminal, a type of a frequency range, a type of a radio network temporary identifier (RNTI) scrambling a cyclic redundancy check (CRC) of DCI, the number of physical resource blocks (PRBs) used to determine intermediate TBS, the modulation and coding scheme (MCS) index used to determine the code rate and modulation order, a coverage capability of the wireless terminal, the value of sub-carrier spacing, or a value of an average orthogonal frequency-division multiplexing (OFDM) symbol duration.

Preferably, the transmission mode is determined based on one of a user equipment (UE) capability and a UE category.

Preferably, the number of physical resource blocks is smaller than or equal to the maximum number of PRBs, wherein the maximum number of PRBs is determined based on at least one of the maximum bandwidth supported by the wireless terminal, the maximum symbols per slot used for data scheduling, and the type of the transmission mode of the wireless terminal.

Preferably, the number of physical resource blocks is smaller than or equal to the maximum number of PRBs, wherein the maximum number of PRBs is determined based on at least one of the maximum bandwidth supported by the wireless terminal, the maximum symbols per slot used for data scheduling, and the type of the transmission mode of the wireless terminal.

Preferably, the type of the transmission mode of the wireless terminal is associated with at least one of the maximum bandwidth supported by the wireless terminal, the minimum bandwidth supported by the wireless terminal, the maximum number of layers supported by the wireless terminal, the maximum number of antenna ports for transmitting the signal, a peak data rate for uplink and/or downlink supported by the wireless terminal, a battery life of the wireless terminal, a modulation order supported by the wireless terminal, the maximum code rate supported by the wireless terminal, the maximum TBS supported by the wireless terminal, the maximum number of physical resource blocks associated with a bandwidth supported by the wireless terminal, a target block error rate of transmitting the signal, an end-to-end latency supported by the wireless terminal, the number of frequency range FR types supported by the wireless terminal, a coverage enhancement capability of the wireless terminal, a power class of the wireless terminal, a processing time capability of the wireless terminal, a type of use case of the wireless terminal, wherein the use case comprises at least one of an industrial wireless sensor, a video surveillance or a wearable device, or a duplex mode of the wireless terminal.

Preferably, the final TBS is smaller than or equal to the maximum TBS.

Preferably, the maximum TBS is determined based on the plurality of transmission parameters.

Preferably, the plurality of transmission parameters includes at least one of the maximum code block size, the maximum code rate supported by the wireless terminal, the maximum code rate of MCS table, the maximum modulation order supported by the wireless terminal and the maximum modulation order of the MCS table.

Preferably, the maximum TBS is one of elements in a TBS table which is greater than or equal to the product of the maximum code block size and a ratio of the maximum code rate supported by the wireless terminal and the maximum code rate in a configurable modulation and coding scheme (MCS) table, the ratio of the maximum code rate supported by the wireless terminal and the maximum code rate in the configurable MCS table is a value in a range [0.27, 0.7201], and the maximum code block size is equal to 3840 for low-density parity-check (LDPC) base graph 2 and is 8448 for LDPC base graph 1.

Preferably, the maximum TBS is one of elements in a TBS table which is greater than or equal to a product of the maximum code block size and a ratio of the maximum modulation order supported by the wireless terminal and the maximum modulation order in a configurable MCS table, the ratio of the maximum modulation order supported by the wireless terminal and the maximum modulation order in the configurable MCS table is a value in a range [0.25, 1], and the maximum code block size is equal to 3840 for LDPC base graph 2 and 8448 for LDPC base graph 1.

Preferably, the maximum TBS for a first type of a transmission mode comprises at least one element in a first TBS set and the maximum TBS for a second type of the transmission mode comprises at least one element in a second TBS set.

Preferably, the transport block is transmitted in a physical downlink shared channel, and the first TBS set comprises at least one of {1000, 1736, 3752, 3824, 3840, 4008, 5160, 8424, 27376, 51240}.

Preferably, the transport block is transmitted in a physical uplink shared channel, and the first TBS set comprises at least one of {328, 408, 456, 504, 600, 712, 808, 936, 1000, 1736, 3752, 3824, 3840, 4008, 5160, 8424}.

Preferably, the transport block is transmitted in a physical downlink shared channel, and the second TBS set comprises at least one of {8424, 15110, 15370, 15620, 15880, 16140, 27376, 50180, 51220}.

Preferably, the transport block is transmitted in a physical uplink shared channel, and the second TBS set comprises at least one of {3824, 5160, 8424, 25100, 27376}.

Preferably, a value of any element in the first TBS set is smaller than or equal to 5160 and a value of any element in the second TBS set is smaller than or equal to 8848.

Preferably, a value of any element in the first TBS set is smaller than or equal to 3840 and a value of any element in the second TBS set is smaller than or equal to 3840.

Preferably, the wireless terminal supports LDPC base graph 2, and the intermediate TBS or the final TBS is smaller than or equal to 3824.

Preferably, the at least one event comprises at least one of the intermediate TBS is greater than 3824, the wireless terminal supports LDPC based graph 2, the type of RNTI scrambling the CRC of the DCI is an RNTI other than the RNTI in Rel-16 NR, or the type of transmission mode is a first type of transmission mode including the maximum modulation order smaller than or equal to 64 quadrature amplitude modulation (QAM).

Preferably, the specific step comprises using a TBS table to determine the closest TBS that is greater than or equal to the modified TBS.

Preferably, each element in the TBS table is different from all of the elements in TBS table in Rel-16 NR.

Preferably, each element in the TBS table is divisible by 3816 and a quotient of the element divided by 3816 is larger than 1.

Preferably, the final TBS is determined by:

$$\text{final } TBS = 8 \cdot C \left\lceil \frac{N'_{info} + 24}{8 \cdot C} \right\rceil,$$

wherein C is determined by $$\left\lceil \frac{N'_{info} + 24}{3816} \right\rceil,$$

wherein $\lceil \ \rceil$ is a ceiling function, $N'_{info}$ is the modified TBS and is determined by:

$$N'_{info} = \max\left(3840, 2^n \times \text{round}\left(\frac{N_{info} - 24}{2^n}\right)\right),$$

wherein max( ) is a function of acquiring the maximum variable, round ( ) is a function of rounding a variable to the closest integer, $N_{info}$ is the intermediate TBS and n is determined by:

$$n = \lfloor \log_2(N_{info} - 24) \rfloor - 5,$$

wherein $\lfloor \ \rfloor$ is a bottom function.

Preferably, the number of physical resource blocks in the signal is quantized by a scaling factor which is associated with a bandwidth of a bandwidth part of the wireless terminal.

Preferably, a MCS table with transform precoding is used for transmitting the transport block, and the wireless terminal is configured with a type of transmission mode which is associated with at least one of a type of a radio network temporary identifier scrambling a cyclic redundancy check of downlink control information, a peak data rate for uplink and/or downlink, a battery life of the wireless terminal, a modulation order supported by the wireless terminal, the maximum code rate, the maximum TBS supported by the wireless terminal, the maximum number of physical resource blocks associated with a bandwidth configured for of a bandwidth part of the wireless terminal, a target block error rate of transmitting the transport block, an end-to-end latency supported by the wireless terminal, the type of frequency range supported by the wireless terminal, a coverage enhancement capability of the wireless terminal, a power class of the wireless terminal, a processing time capability of the wireless terminal, a use case of the wireless terminal, wherein the use case comprises at least one of an industrial wireless sensor, a video surveillance or a wearable device, or a duplex mode supported by the wireless terminal.

Preferably, a buffer size for LDPC rate matching is determined by a higher layer signaling comprising at least one of the maximum bandwidth supported by the wireless terminal, the number of physical resource blocks available for the wireless terminal in a bandwidth supported by the wireless terminal, the maximum number of layers supported by the wireless terminal, a peak data rate supported by the wireless terminal, the maximum modulation order supported by the wireless terminal, a bandwidth part activated for the wireless terminal, or a type of a radio network temporary identifier scrambling cyclic redundancy check of downlink control information.

The present disclosure relates to a wireless terminal, comprising a processor configured to:
    determine an intermediate transport block size (TBS) for a transport block transmitted between the wireless terminal and a wireless network node based on a plurality of transmission parameters,
    modify the intermediate TBS to generate a modified TBS in response to at least one event, and
    determine a final TBS based on the modified TBS and a specific step in response to the at least one event,
    wherein the specific step is determined based on the plurality of transmission parameters.

Various embodiments may preferably implement the following features:

Preferably, the wireless terminal comprises a communication unit configured to receive, from the wireless network, a signal indicating the plurality of transmission parameters.

Preferably, the processor is further configured to perform a wireless communication method of any of the foregoing described methods.

The present disclosure relates to a wireless network node, comprising a communication unit, configured to transmit, to a wireless terminal, a signal indicating a plurality of transmission parameters, and a processor, configured to determine an intermediate transport block size (TBS) for a transport block transmitted between the wireless terminal and the wireless network node based on the plurality of transmission parameters, modify the intermediate TBS to generate a modified TBS in response to at least one event, and determine a final TBS based on the modified TBS and a specific step in response to the at least one event, and wherein the specific step is determined based on the plurality of transmission parameters.

Various embodiments may preferably implement the following feature:

Preferably, the processor is further configured to perform a wireless communication method of any of the foregoing described methods.

The present disclosure relates to a computer program product comprising a computer-readable program medium code stored thereupon, the code, when executed by a processor, causing the processor to implement a wireless communication method recited in any of foregoing methods.

The exemplary embodiments disclosed herein are directed to providing features that will become readily apparent by reference to the following description when taken in conjunction with the accompanying drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 1.

DETAILED DESCRIPTION

Figure 1:
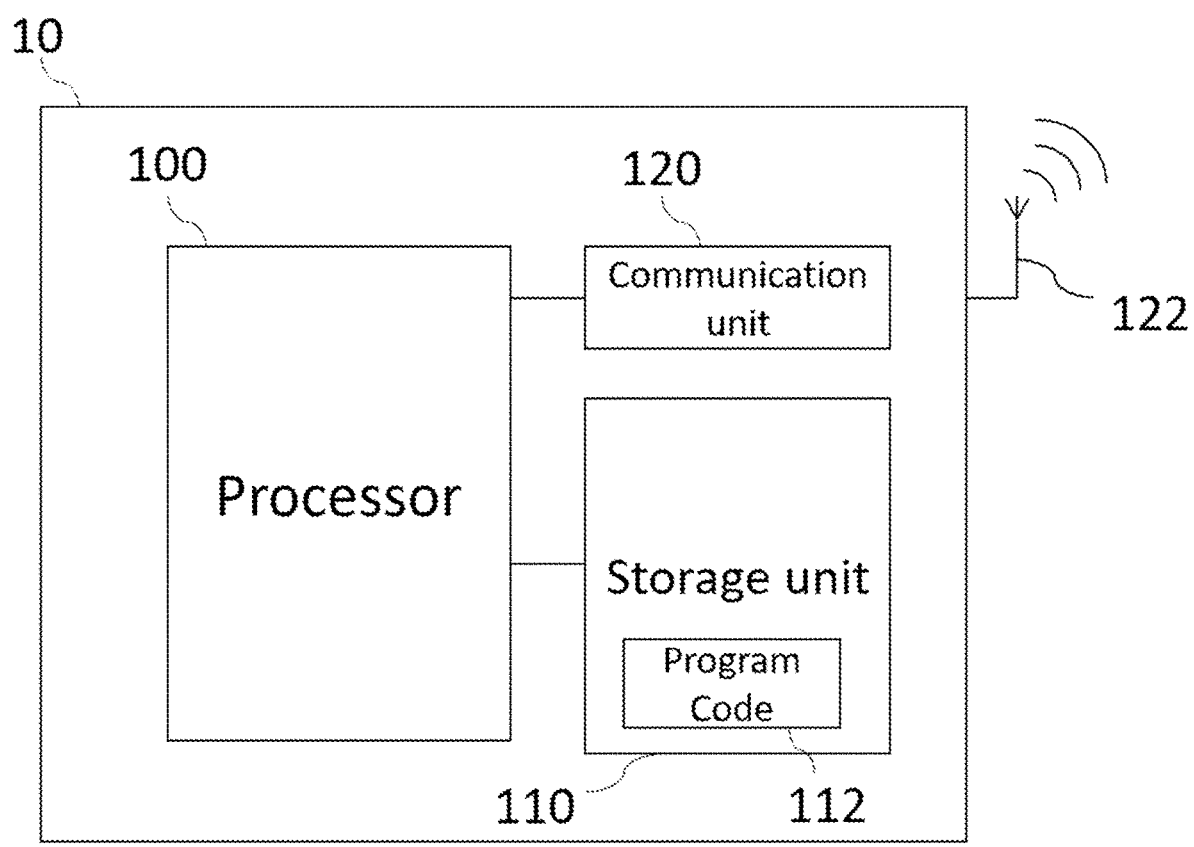
FIG. 1 shows an example of a schematic diagram of a wireless terminal according to an embodiment of the present disclosure.

In an embodiment, the storage unit 110 and the program code 112 may be omitted and the processor 100 may include a storage unit with stored program code.

The processor 100 may implement any one of the steps in exemplified embodiments on the wireless terminal 10, e.g., by executing the program code 112.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
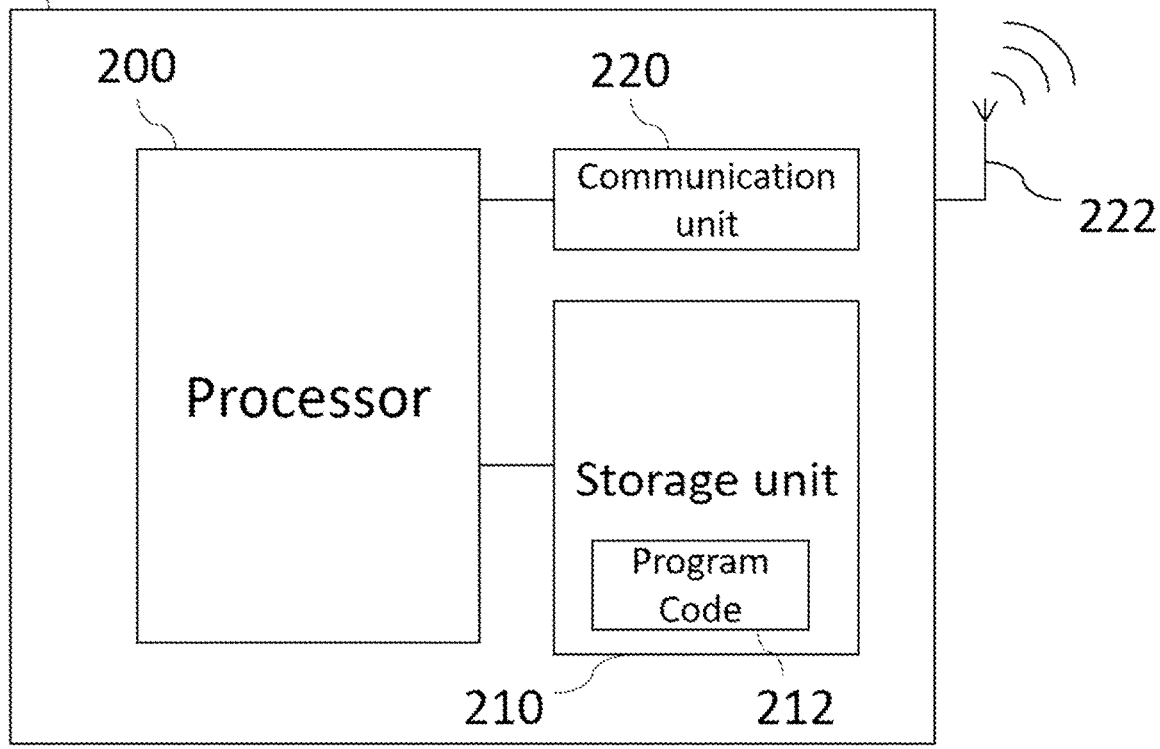
FIG. 2 shows an example of a schematic diagram of a wireless network node according to an embodiment of the present disclosure.

FIG. 2 relates to a schematic diagram of a wireless network node 20 according to an embodiment of the present disclosure. The wireless network node 20 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 20 may comprise (perform) at least one network function such as an access and mobility management function (AMF), a session management function (SMF), a user place function (UPF), a policy control function (PCF), an application function (AF), etc. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20, e.g., via executing the program code 212.

The communication unit 220 may be a transceiver. The communication unit 220 may as an alternative or in addition be combining a transmitting unit and a receiving unit configured to transmit and to receive, respectively, signals to and from a wireless terminal (e.g. a user equipment).

In general, there is a new type of NR device called reduced capability UE (RedCap UE) including three use cases: industrial wireless sensors, video surveillance and wearables. These three types of NR devices have different requirements on the parameters of data rate, end-to-end latency, reliability and battery life as shown in Table 2 below. The data rate among the requirements for different use cases may be very different. Therefore, it is necessary to support a limited or reduced capability for some use cases with lower data rate, such as a limited bandwidth, a limited maximum number of MIMO layers, or a limited modulation order etc. Some of the limited parameters are associated with the transport block size (TBS) determination.

According to an embodiment, the TBS determination methods for RedCap UE described herein are methods of defining the limited capability and TBS determination procedure for RedCap UE.

TABLE 2

Use cases and requirements for Rel-17 REDCAP

| Use cases | Data rate | E-to-E latency | reliability | cost | Battery life |
|---|---|---|---|---|---|
| Industrial wireless sensors (TS 22.104) | less than 2 Mbps (potential asymmetric, e.g. UL heavy traffic) | less than 100 ms, 5~10 ms safety related (TR 22.804) | 99.99% | Low | Few years (≥5 yr in TR 22.832) |
| Video Surveillance | Economic video: 2-4 Mbps High-end video: 7.5-25 Mbps (TR 22.804) | less than 500 ms | 99%~ 99.9% | Medium or less limitation | — |
| Wearables (small in size) | Peak DL up to 150 Mbps, peak UL up to 50 Mbps, 2-5 Mbps in UL and 5-50 Mbps in DL | Same as eMBB | Same as eMBB | Medium | multiple days (up to 1-2 weeks) |

In the present disclosure, the higher layer parameter may be the MAC layer signaling and/or the RRC signaling. In the following embodiments, the term "and" may be used for either "and" or "or" or "and/or". In the present disclosure, a RedCap UE may correspond to a UE with one or more limited parameters, wherein the parameters include at least one of the following: 1) the UL/DL bandwidth, 2) the data rate for UL/DL, 3) the modulation order for UL/DL, 4) the code rate for UL/DL, 5) the number of layers for UL/DL.

In the present disclosure, the parameter may be defined as follows:

In some embodiments, the bandwidth in the unit of MHz represents the frequency domain resource. In some embodiments, the bandwidth may be at least one of the values {1, 2, 2.5, 5, 10, 15, 20, 25, 30, 40, 50, 60, 70, 80, 90, 100} MHz. In some embodiments, the maximum transmission bandwidth configuration $N_{RB}$ for each UE channel bandwidth and subcarrier spacing is specified in Table 3 below.

operating band is different. In some embodiments, the operating band includes at least one of the followings: {n1, n2, n3, n5, n7, n8, n12, n14, n18, n20, n25, n26, n28, n29, n30, n34, n38, n39, n40, n41, n48, n50, n51, n53, n65, n66, n70, n71, n74, n75, n76, n77, n78, n79, n80, n81, n82, n83, n84, n86, n89, n90, n91, n92, n93, n94, n95}. In some embodiments, the operating band may be used for DFT-s-OFDM and/or CP-OFDM waveform configured by higher layer parameter for a UE.

For intra-band contiguous carrier aggregation, a carrier aggregation configuration is a single operating band supporting a carrier aggregation bandwidth class with associated bandwidth combination sets. For each carrier aggregation configuration, requirements are specified for all aggregated channel bandwidths contained in a bandwidth combination set, a UE can indicate support of several bandwidth combination sets per carrier aggregation configuration.

For intra-band non-contiguous carrier aggregation, a carrier aggregation configuration is a single operating band supporting two or more sub-blocks, each of which supports a carrier aggregation bandwidth class.

For inter-band carrier aggregation, a carrier aggregation configuration is a combination of operating bands, each of which supports a carrier aggregation bandwidth class.

In some embodiments, the peak data rate represents the maximum data rate supported by the UE for UL and/or DL. The peak data rate in a unit of Mbps ($10^6$ bits per second) may be determined based on at least one of the followings: 1) the number of aggregated component carriers in a band or band combination, 2) the maximum number of supported layers for the UE for the uplink or downlink, 3) the maximum rate supported by the UE, 4) the maximum modulation order supported by the UE configured by higher layer parameter for uplink or downlink, 5) the scaling factor given by higher layer parameter, 6) the numerology ($\mu$), 7) the average OFDM symbol duration in a subframe for numerology ($\mu$), 8) the maximum RB allocation in bandwidth BW with numerology $\mu$ supported by the UE, 9) the overhead, 10) the maximum TBS supported by the UE. BW is the UE supported maximum bandwidth in the given band or band combination.

In some embodiments, the time of battery life represents the time for the UE to continuously work, i.e. without recharging. In some embodiments, the time of battery life may be longer if the UE uses power saving techniques.

TABLE 3

| | Maximum transmission bandwidth configuration $N_{RB}$ | | | | | | | | | | | | |
|---|---|---|---|---|---|---|---|---|---|---|---|---|---|
| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 70 MHz $N_{RB}$ | 80 MHz $N_{RB}$ | 90 MHz $N_{RB}$ | 100 MHz $N_{RB}$ |
| 15 | 25 | 52 | 79 | 106 | 133 | 160 | 216 | 270 | N/A | N/A | N/A | N/A | N/A |
| 30 | 11 | 24 | 38 | 51 | 65 | 78 | 106 | 133 | 162 | 189 | 217 | 245 | 273 |
| 60 | N/A | 11 | 18 | 24 | 31 | 38 | 51 | 65 | 79 | 93 | 107 | 121 | 135 |

In some embodiments, the maximum number of available PRBs for each maximum transmission bandwidth may be determined by the transmission bandwidth and the minimum guard for each transmission bandwidth and SCS (kHz). For a UE, all PRBs falling within the UE channel bandwidth not covering the minimum guard band may be used.

In some embodiments, the combination of channel bandwidths, SCS and operating bands is specified and the combination of channel bandwidths and SCS available for each In some embodiments, the UE processing time capability represents at least one of the followings: 1) physical downlink shared channel (PDSCH) processing time N1, 2) physical uplink shared channel (PUSCH) preparation procedure time N2, 3) MAC (Medium Access Control) CE (Control Element) processing time, 4) channel state information (CSI) computation time, 5) physical downlink control channel (PDCCH) decoding time, 6) the minimum applicable scheduling offset indicated by DCI format 0_1/1_1 including the minimum applicable K0 and/or K2 and/or the minimum applicable value of the aperiodic CSI-RS triggering offset and/or the minimum applicable value of aperiodic SRS triggering offset, 7) the value of K0, and/or K1, and/or K2, and/or aperiodic CSI-RS triggering offset, and/or aperiodic SRS triggering offset.

The PDSCH processing time N1 may represent a number of symbols for the UE to process PDSCH, which is used to calculate the minimum time gap between the end of the last symbol of the PDSCH carrying the transport block (TB) being acknowledged and the first uplink symbol of the physical uplink control channel (PUCCH), which carriers the Hybrid automatic repeat request acknowledgement (HARQ-ACK) information.

The PUSCH preparation procedure time N2 may represent a number of symbols, which is used to calculate a minimum time gap between the end of the reception of the last symbol of the PDCCH carrying the downlink control information (DCI) scheduling the PUSCH and the first uplink symbol in the PUSCH. MAC CE processing time may represent the time between a PUCCH with HARQ-ACK information and the slot applying the command carried by PDSCH.

The CSI computation time may represent a number of symbols, which is used to calculate a minimum time gap between the end of the last symbol of the PDCCH triggering a CSI report and the uplink symbol of the CSI report, or used to calculate a minimum time gap between the end of the last symbol in time of the latest of: aperiodic channel state information reference signal (CSI-RS) resource for channel measurements, aperiodic CSI-Intereference Measurement (IM) used for interference measurements, and aperiodic non zero power (NZP) CSI-RS for interference measurement and the first uplink symbol of n-th CSI report. PDCCH decoding time may represent the time used for UE to decode a PDCCH/DCI.

Aperiodic CSI-RS triggering offset may include a slot offset between a triggering downlink control information and an aperiodic non zero power channel state information reference signal (NZP CSI-RS) resources set. Aperiodic SRS triggering offset may include an offset in number of slots between the triggering DCI and the actual transmission of this SRS-ResourceSet. K0 may include an offset between DCI and its scheduled PDSCH. K2 may include a slot offset between DCI and its scheduled PUSCH. K1 may include a slot offset between PDSCH and the DL ACK or slot offset between DCI and HARQ. Wherein the minimum K0/K1/K2/A-CSI-RS triggering offset/A-SRS triggering offset are the minimum applicable value of the parameter indicated by DCI format 0_1/1_1.

In some embodiments, the target block error rate (BLER) for the data transmission represents the target BLER to be used to report the available channel quality information (CQI) by the UE. In some embodiments, the target BLER can be at least one of the following values: {0.1, 0.01, 0.001, 0.00001}.

In some embodiments, the power class represents the performance for the UE to consume power. For example, the UE may support power class 3 by using some specific power saving techniques.

In some embodiments, the duplex mode represents the capability of whether both the UE side and the network side are able to receive and transmit data at/to the same resource. The duplex mode in NR may include time-division duplex (TDD) and frequency-division duplex (FDD).

In some embodiments, the frequency range represents the different operation bands. In 5G NR, there are two types of frequency range including FR1 and FR2. FR1 represents an operating band frequency range between 450 MHz and 6000 MHz, and FR2 represents an operating band frequency range between 24250 MHz and 52600 MHz.

In some embodiments, the end-to-end latency means the time of latency for the UE to process data transmission completely relative to the data processed completely in general. In some embodiments, the maximum end-to-end latency supported by the UE can be at least one of the following values: 5 ms, 10 ms, 100 ms and/or 500 ms.

In some embodiments, the type of use case represents the scenario or purpose or device size that the user equipment should use. For example, there can be three types of use cases including 1) industrial wireless sensors, 2) video Surveillance, and 3) wearables according to the different purpose and scenarios. For example, there can be two types of use case including 1) wireless sensors and video Surveillance, 2) wearables according to the different device sizes.

In some embodiments, the coverage capability or the coverage enhancement represents the maximum number of repetition for a data transmission; and/or the transmit power; and/or the SRS transmission power determined by the UE; and/or the UE configured maximum output power for a carrier f of primary cell c in PUCCH transmission occasion i, etc. For example, if the UE supports a smaller maximum number of repetition than the general UE, it means the UE can transmit data under a coverage without a large amount of repetition, namely, the UE has an enhanced coverage capability.

An embodiment relates to a transmission mode for RedCap UE.

In some embodiments, there are N types of transmission modes for the RedCap UE. In some embodiments, each type of transmission mode includes a set of parameters. In some embodiments, the set of parameters for UL and DL includes at least one of the followings:

1) the maximum bandwidth,
2) the minimum bandwidth,
3) the maximum number of layers in spatial domain,
4) the maximum number of antenna ports for data transmission,
5) the peak data rate,
6) the time of battery life,
7) the supported modulation order,
8) the maximum code rate,
9) the supported maximum TBS,
10) the maximum number of PRBs or RBs for the bandwidth,
11) the target BLER for the data transmission,
12) the supported end-to-end latency,
13) the total number of supported frequency range (FR) type,
14) the coverage enhancement capability,
15) power class,
16) the UE processing time capability,
17) the type of use case,
18) the maximum number of SCells for a carrier aggregation (CA) configuration,
19) duplex mode, etc.

In some embodiments, N is an integer which is not smaller than 1, i.e. $N \geq 1$. In some embodiments, N is not larger than 16, i.e. $N \leq 16$. In some embodiments, N is not smaller than 1 and not larger than 16, i.e. $1 \leq N \leq 16$.

In some embodiments, the transmission mode is a UE capability. In some embodiments, the transmission mode is a UE category. In some embodiments, the transmission mode is a higher layer parameter reported by the UE. In some embodiments, the transmission mode is a higher layer parameter transmitted by the network. In some embodiments, the transmission mode is a parameter for the UE supporting release 17. In some embodiments, the transmission mode is a parameter for the UE supporting release 17 and the further release versions.

In some embodiments, at least one of the parameters included in the set of parameters corresponding to the different types of transmission mode have different values. In some embodiments, the TBS determination procedure may be different for different types of transmission modes.

In some embodiments, the value of at least one of the parameters related to a type of transmission mode is defined as P1 and the value of at least one of the parameters related to another type of transmission mode is defined as P2. In some embodiments, P1 is not larger than P2, i.e. P1≤P2. In some embodiments, the total number of types of parameters supported by a transmission mode is not larger than that supported by another type of transmission mode. In some embodiments, the ID of a transmission mode is smaller than that of another type of transmission mode.

Next, UL/DL peak data rate is described in accordance with various embodiments.

In some embodiments, for the parameter of DL peak data rate, P1 is not larger than 150 Mbps and P2 is not less than 150 Mbps. In some embodiments, for the parameter of UL peak data rate, P1 is not larger than 50 Mbps and P2 is not less than 50 Mbps.

For example, there are two types of transmission modes. The DL peak data rate of the first type transmission mode supported by the UE is not larger than 50 Mbps. The DL peak data rate of the second type transmission mode supported by the UE is not less than 150 Mbps. The UL peak data of the second type transmission mode supported by the UE is not larger than 10 Mbps. The UL peak data rate of the second type transmission mode supported by the UE is not less than 50 Mbps.

In some embodiments, the data rate for a given number of aggregated carriers in a band or band combination is determined as followings:

data rate (in Mbps) =

$$10^{-6} \cdot \sum_{j=1}^{J}\left(v_{Layers}^{(j)} \cdot Q_m^{(j)} \cdot f^{(j)} \cdot S^{(j)} \cdot R_{max} \cdot \frac{N_{PRB}^{BW(j),\mu} \cdot 12}{T_s^{\mu}} \cdot (1 - OH^{(j)})\right),$$

wherein J is the number of aggregated component carriers in a band or band combination; $R_{max}$ is the maximum rate supported by the UE; for the j-th Component Carrier (CC); $v_{Layers}^{(j)}$ is the maximum number of supported layers for the UE for the uplink or downlink; $Q_m^{(j)}$ is the maximum modulation order supported by the UE configured by higher layer parameter for uplink or downlink; $f^{(j)}$ is the scaling factor given by higher layer parameter and can take the values 1, 0.8, 0.75, and 0.4; μ is the numerology (as defined in TS 38.211); $T_s^{\mu}$ is the average OFDM symbol duration in a subframe for numerology μ, i.e.

$$T_s^{\mu} = \frac{10^{-3}}{14 \cdot 2^{\mu}}$$

(The normal cyclic prefix is assumed.); $N_{PRB}^{BW(j),\mu}$ is the maximum RB allocation in bandwidth $BW^{(j)}$ with numerology μ supported by the UE; where $BW^{(j)}$ is the UE supported maximum bandwidth in the given band or band combination; $OH^{(j)}$ is the overhead and may take the following values: 1) 0.14, for frequency range FR1 for DL, 2) 0.18, for frequency range FR2 for DL, 3) 0.08, for frequency range FR1 for UL, 4) 0.10, for frequency range FR2 for UL.

$S^{(j)}$ is a new scaling factor and is not larger than 1. In some embodiments, the new scaling factor is the value configured by a higher layer parameter from a first candidate set for the UE supporting the first type of transmission mode. In some embodiments, the new scaling factor is the value configured by a higher layer parameter from a second candidate set for the UE supporting the second type of transmission mode. In some embodiments, at least one of the values in the first candidate set for the new scaling factor is different from the value in the second candidate set. In some embodiments, the new scaling factor is related to at least one of the following parameters for the UE: 1) the number of PRBs allocated, 2) the bandwidth of the active UL/DL BWP, 3) the maximum number of layers, 4) the maximum rate, 5) the maximum modulation order, etc.

For example, $R_{max}$ is not larger than 948/1024 and $Q_m^{(j)}$ is 256 QAM for the second type of transmission mode. For example, $R_{max}$ is not larger than 658/1024 and $Q_m^{(j)}$ is not lower than 16 QAM for the second type of transmission mode.

Next, the bandwidth in accordance with various embodiments is described.

In some embodiments, for the parameter of the maximum bandwidth, P1 is not larger than 20 MHz and P2 is not less than 50 MHz. In some embodiments, for the parameter of the minimum bandwidth, P1 is not larger than 10 MHz and P2 is not less than 10 MHz.

In some embodiments, the maximum bandwidth is related to the supported frequency range. In some embodiments, for the parameter of the maximum bandwidth in FR1, P1 is not larger than 20 MHz and P2 is not less than 20 MHz. In some embodiments, for the parameter of the maximum bandwidth in FR2, P1 is not larger than 40 MHz and P2 is not less than 50 MHz. In some embodiments, for the parameter of the minimum bandwidth in FR1, P1 is not larger than 10 MHz and P2 is not less than 10 MHz. In some embodiments, for the parameter of the minimum bandwidth in FR2, P1 is not larger than 80 MHz and P2 is not less than 10 MHz.

In some embodiments, the maximum bandwidth is related to the subcarrier spacing (SCS). In some embodiments, the maximum bandwidth is scaled by a scaling factor if the SCS is less than 30 KHz. In some embodiments, the maximum bandwidth is scaled by a scaling factor if the SCS is not less than 30 KHz.

In some embodiments, the maximum bandwidth is related to the frequency range. In some embodiments, the maximum bandwidth is scaled by a scaling factor if the FR1 is configured for the UE in the serving cell. In some embodiments, the maximum bandwidth is scaled by a scaling factor if the FR2 is configured for the UE in the serving cell. The scaling factor may be configured by the higher layer parameter and is not larger than 1.

For example, there are two types of transmission modes. The bandwidth of the first type transmission mode supported by the UE is not larger than 20 MHz. The bandwidth of the second type transmission mode supported by the UE is not less than 20 MHz. The UL peak data of the second type transmission mode supported by the UE is not larger than 10 Mbps. The UL peak data rate of the second type transmission mode supported by the UE is not less than 50 Mbps.

Next, bandwidth scaling in accordance with various embodiments is described.

In some embodiments, the bandwidth of the BWP configured for the UE is scaled by a scaling factor $S_{bwp}$. In some embodiments, the scaling factor $S_{bwp}$ is not larger than 1 and is configured by the higher layer parameter. In some embodiments, the scaling factor $S_{bwp}$ is different for the BWPs with different bandwidth. In some embodiments, there are at least four candidate values for the scaling factor $S_{bwp}$.

In some embodiments, the scaling factor $S_{bwp}$ is related to at least one of the following parameters supported by the UE: 1) the type of transmission mode, 2) the BWP ID, 3) the frequency range, 4) the maximum modulation order, 5) the maximum code rate, 6) the maximum number of layers, 7) the bandwidth of the active UL/DL BWP, 8) the number of allocated PRB for the data transmission in PDSCH/PUSCH.

An embodiment relates to TBS determination procedure.

In some embodiments, the TBS is determined by min{the final TBS determined by the TBS determination procedure, the maximum TBS}, wherein min{ } is a function of obtaining the minimum input variable. In some embodiments, the maximum TBS is related to at least one of the following parameters: 1) the uplink or downlink data transmission; 2) the type of transmission mode; 3) the type of frequency range; 4) the type of RNTIs scrambling the CRC of DCI format 0_1 and/or DCI format 1_1 and/or DCI format 0_2 and/or DCI format 1_2 and/or a DCI format new to the DCI format of Release 16; 5) the number of PRBs used for TBS determination; 6) the capability for coverage; 7) the supported transmission numerologies µ; 8) the value of average OFDM symbol duration $T_s^\mu$; 9) the type of the radio link, etc.

In some embodiments, the maximum TBS is determined based on the plurality of transmission parameters. In some embodiments, the plurality of transmission parameters includes at least one of the maximum code block size, the maximum code rate supported by the wireless terminal, the maximum code rate of MCS table, the maximum modulation order supported by the wireless terminal and the maximum modulation order of the MCS table.

In some embodiments, the maximum TBS is one of elements in a TBS table which is greater than or equal to the product of the maximum code block size and a ratio of the maximum code rate supported by the wireless terminal and the maximum code rate in a configurable modulation and coding scheme (MCS) table. In some embodiments, the ratio of the maximum code rate supported by the wireless terminal and the maximum code rate in the configurable MCS table is a value in a range [0.27, 0.7201]. In some embodiments, the maximum code block size is equal to 3840 for low-density parity-check (LDPC) base graph 2 and is 8448 for LDPC base graph 1. In some embodiments, the TBS table includes at least one of the TBS table shown as Table 1, the new TBS table shown as Table 4 and/or Table 5.

In some embodiments, the maximum TBS is one of elements in a TBS table which is greater than or equal to a product of the maximum code block size and a ratio of the maximum modulation order supported by the wireless terminal and the maximum modulation order in a configurable MCS table. In some embodiments, the ratio of the maximum modulation order supported by the wireless terminal and the maximum modulation order in the configurable MCS table is a value in a range [0.25, 1]. In some embodiments, the maximum code block size is equal to 3840 for LDPC base graph 2 and 8448 for LDPC base graph 1. In some embodiments, the TBS table includes at least one of the TBS table shown as Table 1, the new TBS table shown as Table 4 and/or Table 5.

In some embodiments, the maximum TBS for the first transmission mode is at least one of the elements in the first TBS set. In some embodiments, the maximum TBS for the second transmission mode is at least one of the elements in the second TBS set.

In some embodiments, the first TBS set may include at least one of the following elements {1000, 1736, 3752, 3824, 3840, 4008, 5160, 8424, 27376, 51240} for PDSCH. In some embodiments, the first TBS set may include at least one of the following elements {328, 408, 456, 504, 600, 712, 808, 936, 1000, 1736, 3752, 3824, 3840, 4008, 5160, 8424} for PUSCH.

In some embodiments, the second TBS set may include at least one of the following elements {8424, 15110, 15370, 15620, 15880, 16140, 27376, 50180, 51220} for PDSCH. In some embodiments, the first TBS set may include at least one of the following elements {3824, 5160, 8424, 25100, 27376} for PUSCH.

In some embodiments, the value of each element in the first TBS set is not larger than 5160 for UL/DL. In some embodiments, the value of each element in the second TBS set is not smaller than 8448.

In some embodiments, the value of each element in the first TBS set is not larger than 3840 for UL/DL. In some embodiments, the value of each element in the second TBS set is not smaller than 3840.

Next, the number of PRBs used to determine $N_{info}$ and/or TBS is described in accordance with various embodiments.

In some embodiments, the number of PRBs used to determine TBS is determined by a maximum value between the number of allocated PRBs and a maximum number of PRBs supported by the UE for the PUSCH/PDSCH. In some embodiments, the maximum number of PRBs supported by the UE is configured by the higher layer parameter. In some embodiments, the maximum number of PRBs supported by the UE corresponding to each BWP is not larger than the maximum number of PRBs of the corresponding bandwidth in TS 38.101.

In some embodiments, the maximum number of PRBs supported by the UE corresponding to each BWP is not larger than a threshold1. In some embodiments, the maximum number of PRBs supported by the UE corresponding to each BWP is not less than a threshold2. In some embodiments, threshold1 is not less than 270. In some embodiments, threshold2 is not less than 6.

In some embodiments, the number of PRBs used to determine TBS is determined by a scaling factor ($S_{PRB}$) and the number of allocated PRB ($n_{PRB}$) for PDSCH or PUSCH. In some embodiments, the number of PRBs used to determine TBS is determined as ($S_{PRB}*n_{PRB}$). In some embodiments, the scaling factor ($S_{PRB}$) is related to the bandwidth of the active UL/DL BWP for the UE.

In some embodiments, the maximum number of PRBs for each bandwidth is predefined for a specific type of transmission mode. In some embodiments, the quantized number of PRBs for each bandwidth for the UE supported the specific transmission mode is not larger than the original maximum number of PRBs defined in the NR Release 16 specification. In some embodiments, the number of PRBs for different bandwidth are quantized as follows:

| Bandwidth (MHz) | 5 | ... | 20 |
|---|---|---|---|
| Maximum number of PRBs (max_$n_{PRB}$) | N1 | ... | Nx |

In some embodiments, the number of available PRBs for each bandwidth is configured by the higher layer parameter. In some embodiments, the number of available PRB for each bandwidth is related to the type of the transmission mode and/or the bandwidth of the BWP. In some embodiments, the number of PRBs used to determine TBS should be not lager than the available PRB for the corresponding bandwidth.

In some embodiments, the number of PRBs used to determine TBS is determined by a scaling factor and the number of allocated PRBs for PDSCH or PUSCH. In some embodiments, the scaling factor is related to the type of transmission mode.

In some embodiments, the number of PRBs used for TBS determination may not be larger than the maximum number of PRBs. In some embodiments, the number of PRBs used for TBS determination may be determined as the min{the number of allocated PRBs, the number of PRBs} for the UE. In some embodiments, the maximum number of PRBs is related to the type of transmission mode supported by the UE. In some embodiments, the maximum number of PRBs for different transmission mode are quantized as follows:

| The type of transmission mode | Maximum number of PRBs (max_$n_{PRB}$) |
|---|---|
| Mode 1 | N1 |
| ... | ... |
| Mode x | Nx |

In some embodiments, the scaling factor ($S_{PRB}$) for a specific transmission mode is not larger than 1. In some embodiments, the scaling factor ($S_{PRB}$) for the other transmission mode is equal to 1 or is not available. The supported maximum bandwidth, and/or the supported maximum modulation order, and/or the supported maximum number of layers for the specific transmission mode may be smaller than that for the other transmission modes.

In some embodiments, the UE does not expect the number of PRBs allocated for the PDSCH/PUSCH larger than the maximum number of PRBs for the active UL/DL BWP.

In some embodiments, the above method for determining the number of PRBs by using a scaling factor ($S_{PRB}$) can be determined as function($S_{PRB}*n_{PRB}$). In some embodiments, the function( ) represents rounding, and/or rounding down, and/or rounding up, and/or retaining the original value. In some embodiments, the above method for determining the number of PRBs used for TBS determination can be also used to determine the value of $N_{info}$.

Next, MCS determination is described in accordance with various embodiments.

In some embodiments, the supported MCS index is related to at least one of the following parameters: 1) the number of allocated PRBs for PUSCH/PDSCH, 2) the number of layers, 3) the bandwidth for the active BWP, 4) the type of transmission mode supported by the UE.

In some embodiments, if the UE supports the specific type of transmission mode, the maximum MCS index available for the UE is smaller than a threshold1 when the MCS table 1 for PDSCH and/or the MCS table 2 for PDSCH and/or the MCS table 3 for PDSCH and/or the MCS table for PUSCH with transform precoding and/or the MCS table 2 for PUSCH with transform precoding is configured for the UE. In some embodiments, the threshold is not larger than 28. In some embodiments, the specific type of transmission mode is configured by the higher layer parameter.

In some embodiments, the MCS index available for the UE is related to the supported type of transmission mode. In some embodiments, the number of available MCS index for the specific type of transmission mode is less than the other type of transmission mode.

In some embodiments, the UE supporting the specific type of transmission mode may be configured by the MCS table with the maximum modulation order ($Q_m$) not larger than 64 QAM ($Q_m=6$) for PUSCH and/or PDSCH. In some embodiments, the UE supporting the specific type of transmission mode may not be configured by the MCS table with the maximum modulation order ($Q_m$) larger than 256 QAM ($Q_m=8$) for PUSCH and/or PDSCH.

In some embodiments, the UE supporting the specific type of transmission mode is not expected using the MCS table for PUSCH with transform precoding for UL transmission.

In some embodiments, the supported modulation order ($Q_m$) is related to at least one of the following parameters: 1) the number of allocated PRBs for PUSCH/PDSCH, 2) the number of layers, 3) the bandwidth for the active BWP, 4) the type of transmission mode supported by the UE.

In some embodiments, the supported rate (R) is related to at least one of the following parameters: 1) the number of allocated PRBs for PUSCH/PDSCH, 2) the number of layers, 3) the bandwidth for the active BWP, 4) the type of transmission mode supported by the UE.

In some embodiments, the modulation order for the UE supporting the specific type of transmission mode is determined as the minimum value between the modulation order corresponding to the MCS index ($I_{MCS}$) and the maximum modulation order $Q_m^{max}$. Wherein the maximum modulation order supported by the UE can be configured by the higher layer parameter. In some embodiments, the maximum modulation order supported by the UE is related to the type of transmission mode supported by the UE.

In some embodiments, the type of transmission mode is identified by the RNTI scrambling the CRC of the DCI transmitted on PDCCH. In some embodiments, the available MCS table configured for the UE can be determined based on at least one of the following parameters: 1) the type of RNTI scrambling the CRC of the DCI, 2) the type of transmission mode, 3) the type of link of data transmission (i.e. PDSCH data scheduling or PUSCH data scheduling), etc.

Next, the maximum code block size determination is described in accordance with various embodiments.

In some embodiments, the maximum code block size determination is determined by at least one of the following parameters: 1) the number of allocated PRBs for PUSCH/PDSCH, 2) the number of layers, 3) the bandwidth for the active BWP, 4) the type of transmission mode, 5) the selected LDPC base graph, 6) the code rate, 7) the value of TBS supported by the UE.

In some embodiments, the maximum code block size is not larger than 3840 if the UE only supports the LDPC base graph 2 configured by the higher layer parameter. In some embodiments, if the UE only supports the LDPC base graph 2 configured by the higher layer parameter, the UE uses steps 1) and 3) to determine TBS for PDSCH and PUSCH.

In some embodiments, if the UE only supports the LDPC base graph 2 configured by the higher layer parameter and if the value of $N_{info}$ is larger than 3824, the UE uses step 4) to modify the $N_{info}$.

In some embodiments, the maximum code block size for the UE can be larger than 3840 if the higher layer parameter configures the UE supporting the LDPC base graph 1. In some embodiments, if the UE is configured to support LDPC base graph 1, the UE may use steps 1)-4) of TBS determination procedure in Release 16 for PDSCH and PUSCH.

In some embodiments, if the UE only supports the LDPC base graph 2 configured by the higher layer parameter and if the value of $N_{info}$ is larger than 3824, the modified $N_{info}$ ($N'_{info}$) may be determined as the following step to determine TBS.

quantized intermediate number of information bits $$N'_{info} = \max\left(3840, 2^n \times \text{round}\left(\frac{N_{info} - 24}{2^n}\right)\right),$$

where $n = \lfloor \log_2(N_{info} - 24) \rfloor - 5$ and ties in the round function are broken towards the next largest integer.

$$TBS = 8 \cdot C \cdot \left\lceil \frac{N'_{info} + 24}{8 \cdot C} \right\rceil - 24, \text{ where } C = \left\lceil \frac{N'_{info} + 24}{3816} \right\rceil$$

In some embodiments, the UE only supports the LDPC base graph 2 if the higher layer parameter configures the UE supporting the specific type of transmission mode. In some embodiments, the specific type of transmission mode may be configured by the higher layer parameter.

In some embodiments, the UE may support a TBS not larger than a maximum TBS. In some embodiments, the maximum TBS is configured by the higher layer parameter. In some embodiments, the maximum TBS is not larger than a threshold. In some embodiments, the threshold is not smaller than 3824. In some embodiments, the UE may determine the TBS using step 1)-3) of the TBS determination procedure.

In some embodiments, the UE determines the final TBS as the minimum between the maximum TBS and the calculated TBS by the TBS determination procedure. In some embodiments, the TBS determination procedure can be the TBS determination procedure in above embodiments or the TBS determination procedure in NR Rel-16 specification.

In some embodiments, the UE does not expect the determined TBS by the current TBS procedure to be larger than the maximum TBS supported by the UE.

In some embodiments, the UE determines the TBS using steps 1)-3) of the TBS determination procedure. In some embodiments, the UE finds the TBS in the new TBS table closest to the modified TBS ($N'_{info}$) as the final TBS. In some embodiments, the new TBS table is a TBS table including the current TBS elements in the TBS table. In some embodiments, the new TBS table is an extension to the current TBS table. The current TBS table may be TBS table in table 2. In some embodiments, the new TBS table is an additional or independent TBS table new to the current TBS table. The current TBS table may be the TBS table in table 2.

In some embodiments, the elements (E) in the new TBS table can be satisfied with at least one of the following conditions:

1) $\left\lceil \frac{E}{8} \right\rceil = \frac{E}{8}$; and/or

2) $\left\lceil \frac{E+24}{3816} \right\rceil = \frac{E+24}{3816}$ and $\left\lceil \frac{E+24}{3816} \right\rceil \geq 1$; and/or 3) $\left\lceil \frac{E+24}{8424} \right\rceil = \frac{E+24}{8424}$ and $\left\lceil \frac{E+24}{8424} \right\rceil \geq 1$; and/or 4) $\left\lceil \frac{E+24}{\left\lceil \frac{E+24}{3816} \right\rceil \times 8} \right\rceil = \frac{E+24}{\left\lceil \frac{E+24}{3816} \right\rceil \times 8}$ wherein $\left\lceil \frac{E+24}{3816} \right\rceil > 1$; and/or 5) $\left\lceil \frac{E+24}{\left\lceil \frac{E+24}{8424} \right\rceil \times 8} \right\rceil = \frac{E+24}{\left\lceil \frac{E+24}{8424} \right\rceil \times 8}$ wherein $\left\lceil \frac{E+24}{8424} \right\rceil > 1$; and/or 6) $\left\lceil \frac{E+24}{\left\lceil \frac{E+24}{3816} \right\rceil \times \left\lceil \frac{E+24}{8424} \right\rceil \times 8} \right\rceil = \frac{E+24}{\left\lceil \frac{E+24}{3816} \right\rceil \times \left\lceil \frac{E+24}{8424} \right\rceil \times 8}$, wherein $\left\lceil \frac{E+24}{3816} \right\rceil > 1$ and $\left\lceil \frac{E+24}{8424} \right\rceil > 1$;

and/or

7) The maximum value of E is not larger than a threshold, wherein the threshold is 84064.

In some embodiments, if the $N_{info}$ is larger than 3824, the UE may calculate the modified TBS by step 4). In some embodiments, if the $N_{info}$ is larger than 3824, the UE may determine the TBS by finding the TBS in the new TBS table closest to the modified TBS ($N'_{info}$) as the final TBS. In some embodiments, the final TBS (noted as TBS1) closest to the modified TBS ($N'_{info}$) is the TBS in TBS table that is not larger than and closest to the modified TBS ($N'_{info}$). In some embodiments, the final TBS (noted as TBS2) closest to the modified TBS ($N'_{info}$) is the TBS in TBS table that is not less than and closest to the modified TBS.

In some embodiments, the final TBS closest to the modified TBS ($N'_{info}$) is the TBS in the TBS table, which has the smallest gap with the modified TBS ($N'_{info}$). Denote the gap between the TBS1 and modified TBS ($N'_{info}$) as gap1. Denote the gap between the TBS2 and modified TBS ($N'_{info}$) as gap2. In some embodiments, if the gap1 is equal to gap2, the TBS with smaller index is determined as the final TBS.

In some embodiments, the final TBS closest to the modified TBS ($N'_{info}$) is the TBS in the TBS table, which has the smallest gap with the modified TBS ($N'_{info}$). Denote the gap between the TBS1 and modified TBS ($N'_{info}$) as gap1. Denote the gap between the TBS2 and modified TBS ($N'_{info}$) as gap2. In some embodiments, if the gap1 is equal to gap2, the TBS with larger index is determined as the final TBS.

In some embodiments, the new TBS table is shown in table 4.

TABLE 4

| new TBS table | |
|---|---|
| index | TBS |
| 1 | 3848 |
| 2 | 3912 |
| 3 | 3976 |
| 4 | 4040 |
| 5 | 4104 |
| 6 | 4232 |
| 7 | 4360 |
| 8 | 4488 |
| 9 | 4616 |
| 10 | 4744 |
| 11 | 4872 |
| 12 | 5000 |
| 13 | 5128 |
| 14 | 5256 |
| 15 | 5384 |
| 16 | 5512 |
| 17 | 5640 |

TABLE 4-continued

| new TBS table | |
|---|---|
| index | TBS |
| 18 | 5768 |
| 19 | 5896 |
| 20 | 6024 |
| 21 | 6152 |
| 22 | 6280 |
| 23 | 6408 |
| 24 | 6536 |
| 25 | 6664 |
| 26 | 6792 |
| 27 | 6920 |
| 28 | 7048 |
| 29 | 7176 |
| 30 | 7304 |
| 31 | 7432 |
| 32 | 7560 |
| 33 | 7680 |
| 34 | 7824 |
| 35 | 7944 |
| 36 | 8064 |
| 37 | 8208 |
| 38 | 8448 |
| 39 | 8712 |
| 40 | 8976 |
| 41 | 9216 |
| 42 | 9480 |
| 43 | 9744 |
| 44 | 9984 |
| 45 | 10248 |
| 46 | 10512 |
| 47 | 10752 |
| 48 | 11016 |
| 49 | 11280 |
| 50 | 11528 |
| 51 | 11784 |
| 52 | 12040 |
| 53 | 12296 |
| 54 | 12552 |
| 55 | 12808 |
| 56 | 13064 |
| 57 | 13320 |
| 58 | 13576 |
| 59 | 13832 |
| 60 | 14088 |
| 61 | 14344 |
| 62 | 14600 |
| 63 | 14856 |
| 64 | 15112 |
| 65 | 15376 |
| 66 | 15616 |
| 67 | 15896 |
| 68 | 16136 |
| 69 | 16416 |
| 70 | 16896 |
| 71 | 17416 |
| 72 | 17936 |
| 73 | 18456 |
| 74 | 18976 |
| 75 | 19464 |
| 76 | 19992 |
| 77 | 20520 |
| 78 | 21000 |
| 79 | 21528 |
| 80 | 22056 |
| 81 | 22536 |
| 82 | 23048 |
| 83 | 23552 |
| 84 | 24112 |
| 85 | 24616 |
| 86 | 25120 |
| 87 | 25624 |
| 88 | 26128 |
| 89 | 26632 |
| 90 | 27176 |
| 91 | 27688 |
| 92 | 28200 |
| 93 | 28712 |

TABLE 4-continued

| new TBS table | |
|---|---|
| index | TBS |
| 94 | 29224 |
| 95 | 29736 |
| 96 | 30248 |
| 97 | 30720 |
| 98 | 31296 |
| 99 | 31800 |
| 100 | 32304 |
| 101 | 32808 |
| 102 | 33816 |
| 103 | 34856 |
| 104 | 35896 |
| 105 | 36936 |
| 106 | 37896 |
| 107 | 38960 |
| 108 | 40016 |
| 109 | 40984 |
| 110 | 42024 |
| 111 | 43080 |
| 112 | 44040 |
| 113 | 45096 |
| 114 | 46152 |
| 115 | 47192 |
| 116 | 48128 |
| 117 | 49168 |
| 118 | 50264 |
| 119 | 51272 |
| 120 | 52280 |
| 121 | 53288 |
| 122 | 54336 |
| 123 | 55296 |
| 124 | 56376 |
| 125 | 57448 |
| 126 | 58472 |
| 127 | 59496 |
| 128 | 60520 |
| 129 | 61448 |
| 130 | 62536 |
| 131 | 63488 |
| 132 | 64576 |
| 133 | 65640 |
| 134 | 67656 |
| 135 | 69744 |
| 136 | 71720 |
| 137 | 73736 |
| 138 | 75816 |
| 139 | 77928 |
| 140 | 79944 |
| 141 | 81992 |
| 142 | 84064 |
| 143 | |
| 144 | |
| 145 | |
| 146 | |
| 147 | |
| 148 | |
| 149 | |
| 150 | |

In some embodiments, the new TBS table used to determine the final TBS includes at least one of the elements in the table 5.

TABLE 5

| new TBS table | |
|---|---|
| index | TBS |
| 1 | 24 |
| 2 | 32 |
| 3 | 40 |
| 4 | 48 |
| 5 | 56 |
| 6 | 64 |

TABLE 5-continued new TBS table

| index | TBS |
|---|---|
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |
| 94 | 3840 |
| 95 | 3848 |
| 96 | 3904 |
| 97 | 3912 |
| 98 | 3968 |
| 99 | 3976 |
| 100 | 4032 |
| 101 | 4040 |
| 102 | 4096 |
| 103 | 4104 |
| 104 | 4224 |
| 105 | 4232 |
| 106 | 4352 |
| 107 | 4360 |
| 108 | 4480 |
| 109 | 4488 |
| 110 | 4608 |
| 111 | 4616 |
| 112 | 4736 |
| 113 | 4744 |
| 114 | 4864 |
| 115 | 4872 |
| 116 | 4992 |
| 117 | 5000 |
| 118 | 5120 |
| 119 | 5128 |
| 120 | 5248 |
| 121 | 5256 |
| 122 | 5376 |
| 123 | 5384 |
| 124 | 5504 |
| 125 | 5512 |
| 126 | 5632 |
| 127 | 5640 |
| 128 | 5760 |
| 129 | 5768 |
| 130 | 5888 |
| 131 | 5896 |
| 132 | 6016 |
| 133 | 6024 |
| 134 | 6144 |
| 135 | 6152 |
| 136 | 6272 |
| 137 | 6280 |
| 138 | 6400 |
| 139 | 6408 |
| 140 | 6528 |
| 141 | 6536 |
| 142 | 6656 |
| 143 | 6664 |
| 144 | 6784 |
| 145 | 6792 |
| 146 | 6912 |
| 147 | 6920 |
| 148 | 7040 |
| 149 | 7048 |
| 150 | 7168 |
| 151 | 7176 |
| 152 | 7296 |
| 153 | 7304 |
| 154 | 7424 |
| 155 | 7432 |
| 156 | 7552 |
| 157 | 7560 |
| 158 | 7680 |

TABLE 5-continued new TBS table

| index | TBS |
|---|---|
| 159 | 7808 |
| 160 | 7824 |
| 161 | 7936 |
| 162 | 7944 |
| 163 | 8064 |
| 164 | 8192 |
| 165 | 8208 |
| 166 | 8448 |
| 167 | 8456 |
| 168 | 8712 |
| 169 | 8968 |
| 170 | 8976 |
| 171 | 9216 |
| 172 | 9224 |
| 173 | 9480 |
| 174 | 9736 |
| 175 | 9744 |
| 176 | 9984 |
| 177 | 9992 |
| 178 | 10248 |
| 179 | 10504 |
| 180 | 10512 |
| 181 | 10752 |
| 182 | 10760 |
| 183 | 11016 |
| 184 | 11272 |
| 185 | 11280 |
| 186 | 11528 |
| 187 | 11784 |
| 188 | 12040 |
| 189 | 12296 |
| 190 | 12552 |
| 191 | 12808 |
| 192 | 13064 |
| 193 | 13320 |
| 194 | 13576 |
| 195 | 13832 |
| 196 | 14088 |
| 197 | 14344 |
| 198 | 14600 |
| 199 | 14856 |
| 200 | 15112 |
| 201 | 15368 |
| 202 | 15376 |
| 203 | 15616 |
| 204 | 15624 |
| 205 | 15880 |
| 206 | 15896 |
| 207 | 16136 |
| 208 | 16392 |
| 209 | 16416 |
| 210 | 16896 |
| 211 | 17416 |
| 212 | 17424 |
| 213 | 17928 |
| 214 | 17936 |
| 215 | 18432 |
| 216 | 18456 |
| 217 | 18960 |
| 218 | 18976 |
| 219 | 19464 |
| 220 | 19968 |
| 221 | 19992 |
| 222 | 20496 |
| 223 | 20520 |
| 224 | 21000 |
| 225 | 21504 |
| 226 | 21528 |
| 227 | 22032 |
| 228 | 22056 |
| 229 | 22536 |
| 230 | 23040 |
| 231 | 23048 |
| 232 | 23552 |
| 233 | 23568 |
| 234 | 24072 |

TABLE 5-continued new TBS table

| index | TBS |
|---|---|
| 235 | 24112 |
| 236 | 24576 |
| 237 | 24616 |
| 238 | 25104 |
| 239 | 25120 |
| 240 | 25608 |
| 241 | 25624 |
| 242 | 26120 |
| 243 | 26128 |
| 244 | 26632 |
| 245 | 27144 |
| 246 | 27176 |
| 247 | 27656 |
| 248 | 27688 |
| 249 | 28168 |
| 250 | 28200 |
| 251 | 28680 |
| 252 | 28712 |
| 253 | 29192 |
| 254 | 29224 |
| 255 | 29704 |
| 256 | 29736 |
| 257 | 30216 |
| 258 | 30248 |
| 259 | 30720 |
| 260 | 30728 |
| 261 | 31240 |
| 262 | 31296 |
| 263 | 31752 |
| 264 | 31800 |
| 265 | 32264 |
| 266 | 32304 |
| 267 | 32776 |
| 268 | 32808 |
| 269 | 33816 |
| 270 | 34816 |
| 271 | 34856 |
| 272 | 35856 |
| 273 | 35896 |
| 274 | 36896 |
| 275 | 36936 |
| 276 | 37896 |
| 277 | 38936 |
| 278 | 38960 |
| 279 | 39936 |
| 280 | 40016 |
| 281 | 40976 |
| 282 | 40984 |
| 283 | 42016 |
| 284 | 42024 |
| 285 | 43032 |
| 286 | 43080 |
| 287 | 44040 |
| 288 | 45096 |
| 289 | 46104 |
| 290 | 46152 |
| 291 | 47112 |
| 292 | 47192 |
| 293 | 48128 |
| 294 | 48168 |
| 295 | 49168 |
| 296 | 49176 |
| 297 | 50184 |
| 298 | 50264 |
| 299 | 51216 |
| 300 | 51272 |
| 301 | 52224 |
| 302 | 52280 |
| 303 | 53288 |
| 304 | 54296 |
| 305 | 54336 |
| 306 | 55296 |
| 307 | 55304 |
| 308 | 56368 |
| 309 | 56376 |
| 310 | 57376 |

TABLE 5-continued new TBS table

| index | TBS |
|---|---|
| 311 | 57448 |
| 312 | 58384 |
| 313 | 58472 |
| 314 | 59432 |
| 315 | 59496 |
| 316 | 60456 |
| 317 | 60520 |
| 318 | 61448 |
| 319 | 61480 |
| 320 | 62504 |
| 321 | 62536 |
| 322 | 63488 |
| 323 | 63528 |
| 324 | 64552 |
| 325 | 64576 |
| 326 | 65576 |
| 327 | 65640 |
| 328 | 67584 |
| 329 | 67656 |
| 330 | 69672 |
| 331 | 69744 |
| 332 | 71688 |
| 333 | 71720 |
| 334 | 73736 |
| 335 | 73776 |
| 336 | 75792 |
| 337 | 75816 |
| 338 | 77896 |
| 339 | 77928 |
| 340 | 79896 |
| 341 | 79944 |
| 342 | 81976 |
| 343 | 81992 |
| 344 | 83976 |
| 345 | 84064 |
| 346 | 86040 |
| 347 | 88064 |
| 348 | 90176 |
| 349 | 92200 |
| 350 | 94248 |
| 351 | 96264 |
| 352 | 98376 |
| 353 | 100392 |
| 354 | 102416 |
| 355 | 104496 |
| 356 | 106576 |
| 357 | 108552 |
| 358 | 110632 |
| 359 | 112648 |
| 360 | 114776 |
| 361 | 116792 |
| 362 | 118896 |
| 363 | 120936 |
| 364 | 122976 |
| 365 | 125016 |
| 366 | 127080 |
| 367 | 129128 |
| 368 | 131176 |
| 369 | 135296 |
| 370 | 139376 |
| 371 | 143400 |
| 372 | 147576 |
| 373 | 151608 |
| 374 | 155776 |
| 375 | 159880 |
| 376 | 163976 |
| 377 | 167976 |
| 378 | 172176 |
| 379 | 176208 |
| 380 | 180376 |
| 381 | 184424 |
| 382 | 188576 |
| 383 | 192624 |
| 384 | 196776 |
| 385 | 200808 |
| 386 | 204976 |

TABLE 5-continued new TBS table

| index | TBS |
|---|---|
| 387 | 208976 |
| 388 | 213176 |
| 389 | 217128 |
| 390 | 221376 |
| 391 | 225480 |
| 392 | 229576 |
| 393 | 233608 |
| 394 | 237776 |
| 395 | 241720 |
| 396 | 245976 |
| 397 | 250056 |
| 398 | 254176 |
| 399 | 258144 |
| 400 | 262376 |
| 401 | 270576 |
| 402 | 278776 |
| 403 | 286976 |
| 404 | 295176 |
| 405 | 303240 |
| 406 | 311368 |
| 407 | 319784 |
| 408 | 327888 |
| 409 | 335976 |
| 410 | 344376 |
| 411 | 352440 |
| 412 | 360488 |
| 413 | 368872 |
| 414 | 376896 |
| 415 | 385272 |
| 416 | 393272 |
| 417 | 401640 |
| 418 | 409616 |
| 419 | 417976 |
| 420 | 426336 |
| 421 | 434280 |
| 422 | 442632 |
| 423 | 450984 |
| 424 | 458896 |
| 425 | 467240 |
| 426 | 475584 |
| 427 | 483464 |
| 428 | 491800 |
| 429 | 500136 |
| 430 | 507984 |
| 431 | 516312 |
| 432 | 524640 |
| 433 | 540776 |
| 434 | 557416 |
| 435 | 573504 |
| 436 | 590128 |
| 437 | 606504 |
| 438 | 622760 |
| 439 | 638984 |
| 440 | 655800 |
| 441 | 671976 |
| 442 | 688776 |
| 443 | 704904 |
| 444 | 721000 |
| 445 | 737768 |
| 446 | 753816 |
| 447 | 770568 |
| 448 | 786568 |
| 449 | 803304 |
| 450 | 819256 |
| 451 | 835976 |
| 452 | 852696 |
| 453 | 868584 |
| 454 | 885288 |
| 455 | 901344 |
| 456 | 918192 |
| 457 | 934152 |
| 458 | 950984 |
| 459 | 966896 |
| 460 | 983712 |
| 461 | 999576 |
| 462 | 1016376 |

TABLE 5-continued new TBS table

| index | TBS |
|---|---|
| 463 | 1032192 |
| 464 | 1048976 |
| 465 | 1081512 |
| 466 | 1115048 |
| 467 | 1147488 |
| 468 | 1179864 |
| 469 | 1213032 |
| 470 | 1245544 |
| 471 | 1277992 |

In some embodiments, the final TBS is determined by the minimum value between the maximum TBS supported by the UE and the temporary TBS determined by the TBS determining steps 1)-4) in TS 38.214.

In some embodiments, the UE does not expect the final TBS to be larger than the maximum TBS supported by the UE associated with a specific resource configuration. In some embodiments, if the final TBS based on the information indicated by a DCI is larger than the maximum TBS supported by the UE associated with a specific resource configuration, the UE may ignore the scheduling UL/DL data. In some embodiments, the specific resource configuration includes at least one of the followings: the bandwidth, the maximum peak data rate, the frequency range type, the number of activated secondary cells (SCells), and/or the subcarrier spacing.

In some embodiments, the maximum TBS for the different transmission modes supported by the UE may be different. In some embodiments, there is no maximum TBS limitation for the transmission mode with a higher ID. In some embodiments, the maximum TBS for the transmission mode with a higher ID is larger than that for the transmission mode with a lower ID.

In some embodiments, there are two types of transmission modes including first transmission mode and second transmission mode. In some embodiments, the range of the maximum TBS for the first transmission modes may be determined based on at least one of the following parameters supported by the UE:
1) the maximum bandwidth;
2) the number of PRBs available for the UE in the bandwidth;
3) the maximum number of layers;
4) the DL and/or UL peak data rate;
5) the maximum modulation order;
6) the maximum rate;
7) the current active BWP;
8) the scheduled active BWP, etc.

In some embodiments, the above parameters are the value configured in the active DL and/or UL BWP.

In some embodiments, the TBS determination is related to the base graph for low density parity check (LDPC) coding.

In some embodiments, the $N_{info}$ is modified by the scaling factor. In some embodiments, the scaling factor is not larger than 1. In some embodiments, the scaling factor is configured by the higher layer parameter. In some embodiments, the scaling factor is determined based on the number of PRBs available for PUSCH and/or PDSCH and the maximum number of PRBs available for PUSCH and/or PDSCH for active and/or scheduled BWP.

In some embodiments, the UE can select a specific TBS determination Step to determine the final TBS based on the $N_{info}$, and/or at least one of the parameters related to the TBS determination described in above embodiments. In some embodiments, the specific TBS determination Step can be at least one step in the TBS determination procedure in the above embodiments.

Next, an embodiment related to soft/limited buffer size is described.

In some embodiments, the determination procedure for the limited buffer for rate matching for LDPC coding for UL-SCH and DL-SCH/PCH is based on the following parameters:
1) the maximum number of layers for one TB for UL-SCH and/or DL-SCH/PCH;
2) the MCS table available for the UE configured by the higher layer parameters;
3) the maximum modulation order corresponding to the available MCS table;
4) the maximum coding rate;
5) the number of PRBs;
6) the number of code blocks;
7) the type of transmission mode;
8) the maximum number of resource elements per PRB;
9) the type of RNTI scrambling the CRC of the DCI, etc.

In some embodiments, the number of PRBs used for determining the $TBS_{LBRM}$ may be configured by the higher layer parameter for each bandwidth. In some embodiments, the number of PRBs used for determining the $TBS_{LBRM}$ may be determined as the number of PRBs $n_{PRB,LBRM}$ defined in the NR Release 16 for each bandwidth if the higher layer parameter configures the UE to support the type of transmission mode other than the specific transmission mode. In some embodiments, the number of PRBs used for determining the $TBS_{LBRM}$ may be determined as the scaled number of PRBs $n_{PRB,LBRM}$ defined in the NR Release 16 for each bandwidth by a scaling factor if the higher layer parameter configures the UE to support the specific transmission mode. In some embodiments, the number of PRBs used for determining the $TBS_{LBRM}$ may be determined as the scaled number of PRBs $n_{PRB,LBRM}$ defined in the NR Release 16 for each bandwidth by a scaling factor if the higher layer parameter configures the UE with the scaling factor for the number of PRBs used for determining the $TBS_{LBRM}$.

In some embodiments, the number of PRBs is determined as the quantized value of $n'_{PRB}$ predefined in a specific table. In some embodiments, the number of PRBs is quantized by a specific table. In some embodiments, the quantized value of $n'_{PRB}$ in each range is not larger than the corresponding quantized value of $n'_{PRB}$ in the same range as shown in the following table 6.

TABLE 6

Value of $n'_{PRB}$

| Maximum number of PRBs across all configured DL BWPs and UL BWPs respectively | $n'_{PRB}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In some embodiments, the TBS determination procedure defined in the above methods may be reused to determine the $TBS_{LBRM}$.

In some embodiments, the UE determines the final TBS based on the above assumed parameters and modifies the final TBS by a scaling factor of rate matching ($S_{RM}$) and a predefined function to generate the modified final TBS. In some embodiments, the UE determines the modified final TBS as the $TBS_{LBRM}$. In some embodiments, the predefined function represents rounding, and/or rounding down, and/or rounding up, and/or retaining the original value.

In some embodiments, the UE determines the maximum TBS as the $TBS_{LBRM}$. In some embodiments, the maximum TBS is reported by the UE. In some embodiments, the maximum TBS is related to at least one of the following parameters:
1) the maximum bandwidth;
2) the number of PRBs available for the UE in the bandwidth;
3) the maximum number of layers;
4) the DL and/or UL peak data rate;
5) the maximum modulation order;
6) the maximum rate;
7) the current active BWP;
8) the scheduled active BWP, etc.

In some embodiments, the maximum modulation order is determined as the value configured by the higher layer parameter. In some embodiments, the higher layer parameter is related to the type of transmission mode.

In some embodiments, the maximum code rate may be the value that is not larger than 948/1024. In some embodiments, the maximum code rate is determined as the value configured by the higher layer parameter. In some embodiments, the higher layer parameter is related to the type of transmission mode.

In summary, as apparent from the foregoing description, embodiments comprise one or more of the following aspects:
1) The TBS determination is related to at least one of the following parameters:
   a. the uplink or downlink data transmission;
   b. the type of transmission mode;
   c. the type of frequency range;
   d. the type of RNTIs scrambling the CRC of DCI format 0_1 and/or DCI format 1_1 and/or DCI format 0_2 and/or DCI format 1_2 and/or a DCI format new to the DCI format of Release 16;
   e. the number of PRBs used for TBS determination;
   f. the capability for coverage;
   g. the supported transmission numerologies μ;
   h. the value of average OFDM symbol duration $T_s^\mu$.
2) The TBS may be determined by min(TBS determined by TBS procedure in Release 16, the maximum TBS).
   a. The maximum TBS may be related to at least one of the followings:
      i. the uplink or downlink data transmission;
      ii. the type of transmission mode;
      iii. the type of frequency range;
      iv. the type of RNTIs scrambling the CRC of DCI format 0_1 and/or DCI format 1_1 and/or DCI format 0_2 and/or DCI format 1_2 and/or a DCI format new to the DCI format of Release 16;
      v. the number of PRBs used for TBS determination;
      vi. the capability for coverage;
      vii. the supported transmission numerologies μ;
      viii. the value of average OFDM symbol duration $T_s^\mu$.
   b. The maximum TBS for the first transmission mode is at least one of the elements in the first TBS set. The maximum TBS for the second transmission mode is at least one of the elements in the second TBS set.
      i. The first TBS set may include at least one of the following elements {1000, 1736, 3752, 3824, 3840, 4008, 5160, 8424, 27376, 51240} for PDSCH. The first TBS set may include at least one of the following elements {328, 408, 456, 504, 600, 712, 808, 936, 1000, 1736, 3752, 3824, 3840, 4008, 5160, 8424} for PUSCH.
      ii. The second TBS set may include at least one of the following elements {8424, 15110, 15370, 15620, 15880, 16140, 27376, 50180, 51220} for PDSCH. The first TBS set may include at least one of the following elements {3824, 5160, 8424, 25100, 27376} for PUSCH.
      iii. The value of each element in the first TBS set is not larger than 5160 for UL/DL. The value of each element in the second TBS set is not smaller than 8448.
      iv. The value of each element in the first TBS set is not larger than 3840 for UL/DL. The value of each element in the second TBS set is not smaller than 3840.
3) The TBS is determined by some of the specific steps of the TBS determination procedure.
   a. if the UE only supports the LDPC base graph 2 configured by the higher layer parameter, the UE uses steps 1)-3) to determine TBS for PDSCH and PUSCH.
   b. if the UE is configured to support LDPC base graph 1, the UE may use steps 1)-4) of TBS determination procedure in Release 16 for PDSCH and PUSCH. When $N_{info}>3824$, the UE may use a new TBS table to determine the final TBS according to the modified TBS ($N'_{info}$). The $N'_{info}$ is determined based on $N_{info}$ according to step 4). The TBS in the TBS table should be satisfied with the following conditions:

$$\left\lceil \frac{E+24}{3816} \right\rceil = \frac{E+24}{3816} \text{ and } \left\lceil \frac{E+24}{3816} \right\rceil \geq 1; \text{ and/or} \quad 1)$$

$$\left\lceil \frac{E+24}{8424} \right\rceil = \frac{E+24}{8424} \text{ and } \left\lceil \frac{E+24}{8424} \right\rceil \geq 1; \text{ and/or} \quad 2)$$

$$\left\lceil \frac{E+24}{\left\lceil \frac{E+24}{3816} \right\rceil \times 8} \right\rceil = \frac{E+24}{\left\lceil \frac{E+24}{3816} \right\rceil \times 8}, \text{ wherein } \left\lceil \frac{E+24}{3816} \right\rceil > 1; \text{ and/or} \quad 3)$$

$$\left\lceil \frac{E+24}{\left\lceil \frac{E+24}{8424} \right\rceil \times 8} \right\rceil = \frac{E+24}{\left\lceil \frac{E+24}{8424} \right\rceil \times 8}, \text{ wherein } \left\lceil \frac{E+24}{8424} \right\rceil > 1; \text{ and/or} \quad 4)$$

$$\left\lceil \frac{E+24}{\left\lceil \frac{E+24}{3816} \right\rceil \times \left\lceil \frac{E+24}{8424} \right\rceil \times 8} \right\rceil = \frac{E+24}{\left\lceil \frac{E+24}{3816} \right\rceil \times \left\lceil \frac{E+24}{8424} \right\rceil \times 8}, \quad 5)$$

wherein $\left\lceil \frac{E+24}{3816} \right\rceil > 1$ and $\left\lceil \frac{E+24}{8424} \right\rceil > 1$;

and/or

6) The maximum value of E is not larger than a threshold, wherein the threshold is 84064.
   c. if the UE only supports the LDPC base graph 2 configured by the higher layer parameter, the final TBS may be determined by $$TBS = 8 \cdot C \cdot \left\lceil \frac{N'_{info} + 24}{8 \cdot C} \right\rceil - 24$$

by using the modified $N_{info}$ ($N'_{info}$) in step 4), where $$C = \left\lceil \frac{N'_{info} + 24}{3816} \right\rceil.$$

d. The number of PRBs is quantized by $(S_{PRB} * n_{PRB})$. The scaling factor $(S_{PRB})$ may be related to the bandwidth of the active UL/DL BWP for the UE.
e. For UL data scheduling, the MCS table with transform precoding is used if the UE is configured by a specific transmission mode. The transmission mode may related to the followings:
  i. the type of RNTI scrambling the CRC of a DCI
  ii. the peak data rate,
  iii. the time of battery life,
  iv. the supported modulation order,
  v. the maximum code rate,
  vi. the supported maximum TBS,
  vii. the maximum number of PRBs associated with the bandwidth,
  viii. the target BLER for the data transmission,
  ix. the supported end-to-end latency,
  x. the total number of supported frequency range (FR) type,
  xi. the coverage enhancement capability,
  xii. power class,
  xiii. processing time capability,
  xiv. the type of use case,
  xv. duplex mode.
4) The buffer size for LDPC rate matching is determined as the maximum TBS. The maximum TBS may be configured by a higher layer parameter. The higher layer parameter may be least one of the following:
  a. the maximum bandwidth;
  b. the number of PRBs available for the UE in the bandwidth;
  c. the maximum number of layers;
  d. the DL and/or UL peak data rate;
  e. the maximum modulation order;
  f. the maximum rate;
  g. the current active BWP;
  h. the type of RNTI scrambling the CRC of a DCI.
5) The different transmission modes include different value of parameters, wherein the parameters are at least one of the following:
  a. the maximum bandwidth,
  b. the minimum bandwidth,
  c. the maximum number of layers in spatial domain,
  d. the maximum number of antenna ports for data transmission,
  e. the peak data rate,
  f. the time of battery life,
  g. the supported modulation order,
  h. the maximum code rate,
  i. the supported maximum TBS,
  j. the maximum number of PRBs associated with the bandwidth,
  k. the target BLER for the data transmission,
  l. the supported end-to-end latency,
  m. the total number of supported frequency range (FR) type,
  n. the coverage enhancement capability,
  o. power class,
  p. processing time capability,
  q. the type of use case,
  r. duplex mode, etc.

Figure 3:
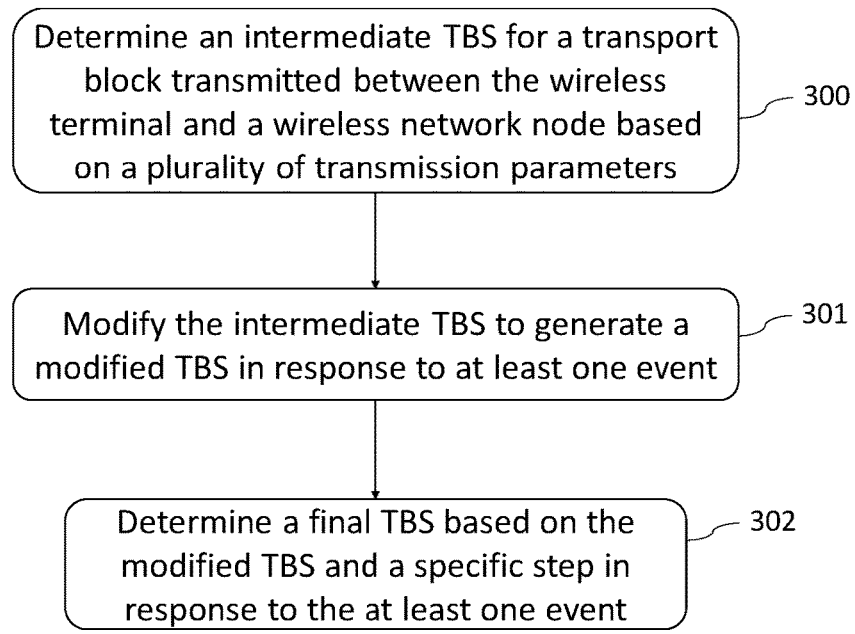
FIG. 3 shows a flowchart of a process according to an embodiment according to an embodiment of the present disclosure.

FIG. 3 shows a flowchart of a process according to an embodiment according to an embodiment of the present disclosure. The process shown in FIG. 3 may be used in a wireless terminal (e.g. UE) and comprises the following steps:

Step 300: Determine an intermediate TBS for a transport block transmitted between the wireless terminal and a wireless network node based on a plurality of transmission parameters.

Step 301: Modify the intermediate TBS to generate a modified TBS in response to at least one event.

Step 302: Determine a final TBS based on the modified TBS and a specific step in response to the at least one event.

More specifically, the wireless terminal determines an intermediate TBS for a transport block transmitted between the wireless terminal and a wireless network node based on a plurality of transmission parameters. Next, the wireless terminal modifies the intermediate TBS in response to at least one event, to generate a modified TBS. Based on the modified TBS and a specific step in response to the at least one event, the wireless terminal determines a final TBS for the transport block transmitted between the wireless terminal.

In an embodiment, the plurality of transmission parameters comprises at least one of (1) a DCI format, (2) a type of a transmission mode configured for the wireless terminal, (3) a type of a frequency range, (4) a type of an RNTI scrambling a CRC of DCI, (5) the number of PRBs used to determine intermediate TBS, (6) the MCS index used to determine the code rate and modulation order, (7) a coverage capability of the wireless terminal, (8) the value of sub-carrier spacing, or (9) a value of an average OFDM symbol duration.

In an embodiment, the wireless terminal may receive, from the wireless network node, a signal indicating the plurality of transmission parameters.

The features and/or details of the plurality of transmission parameters and/or the at least one event and/or the specific step can refer to aforementioned embodiments and are not described herein for brevity.

Figure 4:
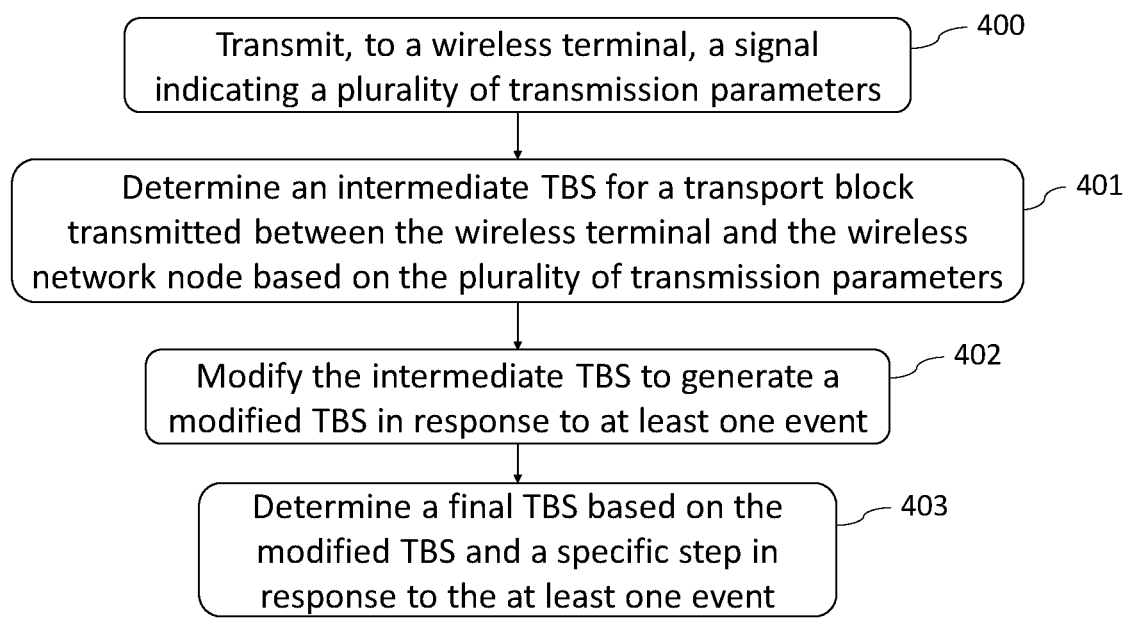
FIG. 4 shows a flowchart of a process according to an embodiment according to an embodiment of the present disclosure.

FIG. 4 shows a flowchart of a process according to an embodiment according to an embodiment of the present disclosure. The process shown in FIG. 4 may be used in a wireless network node (e.g. BS) and comprises the following steps:

Step 400: Transmit, to a wireless terminal, a signal indicating a plurality of transmission parameters.

Step 401: Determine an intermediate TBS for a transport block transmitted between the wireless terminal and the wireless network node based on the plurality of transmission parameters.

Step 402: Modify the intermediate TBS to generate a modified TBS in response to at least one event.

Step 403: Determine a final TBS based on the modified TBS and a specific step in response to the at least one event.

Specifically, the wireless network node transmits a signal to a wireless terminal (e.g. UE) to indicate a plurality of transmission parameters. In this embodiment, the wireless network node determines an intermediate TBS for a transport block transmitted between the wireless terminal and a wireless network node based on a plurality of transmission parameters. Next, the wireless network node modifies the intermediate TBS in response to at least one event, to generate a modified TBS. Based on the modified TBS and a specific step in response to the at least one event, the wireless network node determines a final TBS for the transport block transmitted between the wireless terminal.

As an alternative or in addition, the wireless network node may receive, from the wireless terminal, the TBS determined by the wireless terminal.

In an embodiment, the plurality of transmission parameters comprises at least one of (1) a DCI format, (2) a type of a transmission mode configured for the wireless terminal, (3) a type of a frequency range, (4) a type of an RNTI scrambling a CRC of DCI, (5) the number of PRBs used to determine intermediate TBS, (6) the MCS index used to determine the code rate and modulation order, (7) a coverage capability of the wireless terminal, (8) the value of sub-carrier spacing, or (9) a value of an average OFDM symbol duration.

The features and/or details of the plurality of transmission parameters and/or the at least one event and/or the specific step can refer to aforementioned embodiments and are not described herein for brevity.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a wireless terminal, the wireless communication method comprising:
receiving, from a wireless network node, a signal indicating a plurality of transmission parameters,
determining an intermediate transport block size (TBS) for a transport block transmitted between the wireless terminal and the wireless network node based on the plurality of transmission parameters,
modifying the intermediate TBS to generate a modified TBS in response to at least one event, and
determining a final TBS based on the modified TBS and a specific step in response to the at least one event,
wherein the specific step is determined based on the plurality of transmission parameters,
wherein the plurality of transmission parameters comprises a type of a transmission mode configured for the wireless terminal, and wherein the transmission mode is determined based on one of a user equipment (UE) capability and a UE category,
wherein a number of physical resource blocks (PRBs) in the signal is quantized by a scaling factor which is associated with a bandwidth of a bandwidth part of the wireless terminal.

2. The wireless communication method of claim 1, wherein the plurality of transmission parameters comprises at least one of:
a downlink control information (DCI) format,
a type of a frequency range,
a type of a radio network temporary identifier (RNTI) scrambling a cyclic redundancy check (CRC) of DCI,
a number of PRBs used to determine the intermediate TBS,
a modulation and coding scheme (MCS) index used to determine a code rate and modulation order,
a coverage capability of the wireless terminal,
a value of sub-carrier spacing, or
a value of an average orthogonal frequency-division multiplexing (OFDM) symbol duration,
wherein the number of physical resource blocks is smaller than or equal to a maximum number of PRBs, wherein the maximum number of PRBs is determined based on at least one of a maximum bandwidth supported by the wireless terminal, the maximum symbols per slot used for data scheduling, and the type of the transmission mode of the wireless terminal, and
wherein the type of the transmission mode of the wireless terminal is associated with at least one of:
the maximum bandwidth supported by the wireless terminal,
a minimum bandwidth supported by the wireless terminal,
a maximum number of layers supported by the wireless terminal,
a maximum number of antenna ports for transmitting the signal,
a peak data rate for uplink and/or downlink supported by the wireless terminal,
a battery life of the wireless terminal,
a modulation order supported by the wireless terminal,
a maximum code rate supported by the wireless terminal,
a maximum TBS supported by the wireless terminal,
a maximum number of PRBs associated with a bandwidth supported by the wireless terminal,
a target block error rate of transmitting the signal,
an end-to-end latency supported by the wireless terminal,
a number of frequency range (FR) types supported by the wireless terminal,
a coverage enhancement capability of the wireless terminal,
a power class of the wireless terminal,
a processing time capability of the wireless terminal,
a type of use case of the wireless terminal, wherein the use case comprises at least one of an industrial wireless sensor, a video surveillance or a wearable device, or
a duplex mode of the wireless terminal.

3. The wireless communication method of claim 1, wherein the final TBS is smaller than or equal to a maximum TBS,
wherein the maximum TBS is determined based on the plurality of transmission parameters,
wherein the plurality of transmission parameters includes at least one of a maximum code block size, a maximum code rate supported by the wireless terminal, a maximum code rate of a modulation and coding scheme (MCS) table, a maximum modulation order supported by the wireless terminal and a maximum modulation order of the MCS table,
wherein the maximum TBS is:
one of elements in a TBS table which is greater than or equal to a product of the maximum code block size and a ratio of the maximum code rate supported by the wireless terminal and the maximum code rate in a configurable modulation and coding scheme (MCS) table, wherein the ratio of the maximum code rate supported by the wireless terminal and the maximum code rate in the configurable MCS table is a value in a range [0.27, 0.7201], and wherein the maximum code block size is equal to 3840 for low-density parity-check (LDPC) base graph 2 and is 8448 for LDPC base graph 1, or
one of elements in a TBS table which is greater than or equal to a product of the maximum code block size and a ratio of the maximum modulation order supported by the wireless terminal and the maximum modulation order in a configurable MCS table, wherein the ratio of the maximum modulation order supported by the wireless terminal and the maximum modulation order in the configurable MCS table is a value in a range [0.25, 1], and wherein the maximum code block size is equal to 3840 for LDPC base graph 2 and 8448 for LDPC base graph 1.

4. The wireless communication method of claim 1, wherein the final TBS is smaller than or equal to a maximum TBS,
   wherein the maximum TBS for a first type of a transmission mode comprises at least one element in a first TBS set and the maximum TBS for a second type of the transmission mode comprises at least one element in a second TBS set,
   wherein the transport block is transmitted in:
      a physical downlink shared channel, wherein the first TBS set comprises at least one of {1000, 1736, 3752, 3824, 3840, 4008, 5160, 8424, 27376, 51240},
      a physical uplink shared channel, wherein the first TBS set comprises at least one of {328, 408, 456, 504, 600, 712, 808, 936, 1000, 1736, 3752, 3824, 3840, 4008, 5160, 8424},
      a physical downlink shared channel, wherein the second TBS set comprises at least one of {8424, 15110, 15370, 15620, 15880, 16140, 27376, 50180, 51220}, or
      a physical uplink shared channel, wherein the second TBS set comprises at least one of {3824, 5160, 8424, 25100, 27376}, and
   wherein:
      a value of any element in the first TBS set is smaller than or equal to 5160 and a value of any element in the second TBS set is smaller than or equal to 8848, or
      a value of any element in the first TBS set is smaller than or equal to 3840 and a value of any element in the second TBS set is smaller than or equal to 3840.

5. The wireless communication method of claim 1, wherein the wireless terminal supports LDPC base graph 2, and
   wherein the intermediate TBS or the final TBS is smaller than or equal to 3824.

6. The wireless communication method of claim 1, wherein the at least one event comprises at least one of the intermediate TBS is greater than 3824, the wireless terminal supports LDPC based graph 2, a type of RNTI scrambling a cyclic redundancy check (CRC) of downlink control information (DCI) is a radio network temporary identifier (RNTI) other than the RNTI in Rel-16 NR, or a type of transmission mode is a first type of transmission mode including a maximum modulation order smaller than or equal to 64 quadrature amplitude modulation (QAM),
   wherein the specific step comprises using a TBS table to determine a closest TBS that is greater than or equal to the modified TBS, each element in the TBS table is different from all of the elements in TBS table in Rel-16 NR, and each element in the TBS table is divisible by 3816 and a quotient of the element divided by 3816 is larger than 1,
   wherein the final TBS is determined by:

$$\text{final } TBS = 8 \cdot C \left\lceil \frac{N'_{info} + 24}{8 \cdot C} \right\rceil,$$

wherein C is determined by $$\left\lceil \frac{N'_{info} + 24}{3816} \right\rceil,$$

wherein $\lceil \ \rceil$ is a ceiling function, $N'_{info}$ is the modified TBS and is determined by:

$$N'_{info} = \max\left(3840, 2^n \times \text{round}\left(\frac{N_{info} - 24}{2^n}\right)\right),$$

wherein max( ) is a function of acquiring the maximum variable, round ( ) is a function of rounding a variable to the closest integer, $N_{info}$ is the intermediate TBS and n is determined by:

$$n = \lfloor \log_2(N_{info} - 24) \rfloor - 5,$$

wherein $\lfloor \ \rfloor$ is a bottom function.

7. The wireless communication method of claim 1, wherein a MCS table with transform precoding is used for transmitting the transport block, and
   wherein the wireless terminal is configured with a type of transmission mode which is associated with at least one of:
      a type of a radio network temporary identifier scrambling a cyclic redundancy check of downlink control information,
      a peak data rate for uplink and/or downlink,
      a battery life of the wireless terminal,
      a modulation order supported by the wireless terminal,
      a maximum code rate,
      a maximum TBS supported by the wireless terminal,
      a maximum number of PRBs associated with a bandwidth configured for a bandwidth part of the wireless terminal,
      a target block error rate of transmitting the transport block,
      an end-to-end latency supported by the wireless terminal,
      a type of frequency range supported by the wireless terminal,
      a coverage enhancement capability of the wireless terminal,
      a power class of the wireless terminal,
      a processing time capability of the wireless terminal,
      a use case of the wireless terminal, wherein the use case comprises at least one of an industrial wireless sensor, a video surveillance or a wearable device, or
      a duplex mode supported by the wireless terminal.

8. The wireless communication method of claim 1, wherein a buffer size for low-density parity-check (LDPC) rate matching is determined by a higher layer signaling comprising at least one of:
      a maximum bandwidth supported by the wireless terminal,
      a number of physical resource blocks PRBs available for the wireless terminal in a bandwidth supported by the wireless terminal,
      a maximum number of layers supported by the wireless terminal,
      a peak data rate supported by the wireless terminal,
      a maximum modulation order supported by the wireless terminal,
      a bandwidth part activated for the wireless terminal, or
      a type of a radio network temporary identifier scrambling cyclic redundancy check of downlink control information.

9. A wireless communication method for use in a wireless network node, the wireless communication method comprising:

transmitting, to a wireless terminal, a signal indicating a plurality of transmission parameters;
determining an intermediate transport block size (TBS) for a transport block transmitted between the wireless terminal and the wireless network node based on the plurality of transmission parameters,
modifying the intermediate TBS to generate a modified TBS in response to at least one event, and
determining a final TBS based on the modified TBS and a specific step in response to the at least one event,
wherein the specific step is determined based on the plurality of transmission parameters,
wherein the plurality of transmission parameters comprises a type of a transmission mode configured for the wireless terminal, and wherein the transmission mode is determined based on one of a user equipment (UE) capability and a UE category,
wherein a number of physical resource blocks (PRBs) in the signal is quantized by a scaling factor which is associated with a bandwidth of a bandwidth part of the wireless terminal.

10. The wireless communication method of claim 9, wherein the plurality of transmission parameters comprises at least one of:
a downlink control information (DCI) format,
a type of a frequency range,
a type of a radio network temporary identifier (RNTI) scrambling a cyclic redundancy check (CRC) of DCI,
a number of PRBs used to determine the intermediate TBS,
a modulation and coding scheme (MCS) index used to determine a code rate and modulation order,
a coverage capability of the wireless terminal,
a value of sub-carrier spacing, or
a value of an average orthogonal frequency-division multiplexing (OFDM) symbol duration,
wherein the number of physical resource blocks is smaller than or equal to a maximum number of PRBs, wherein the maximum number of PRBs is determined based on at least one of a maximum bandwidth supported by the wireless terminal, the maximum symbols per slot used for data scheduling, and the type of the transmission mode of the wireless terminal, and
wherein the type of the transmission mode of the wireless terminal is associated with at least one of:
the maximum bandwidth supported by the wireless terminal,
a minimum bandwidth supported by the wireless terminal,
a maximum number of layers supported by the wireless terminal,
a maximum number of antenna ports for transmitting the signal,
a peak data rate for uplink and/or downlink supported by the wireless terminal,
a battery life of the wireless terminal,
a modulation order supported by the wireless terminal,
a maximum code rate supported by the wireless terminal,
a maximum TBS supported by the wireless terminal,
a maximum number of PRBs associated with a bandwidth supported by the wireless terminal,
a target block error rate of transmitting the signal,
an end-to-end latency supported by the wireless terminal,
number of frequency range (FR) types supported by the wireless terminal,
a coverage enhancement capability of the wireless terminal,
a power class of the wireless terminal,
a processing time capability of the wireless terminal,
a type of use case of the wireless terminal, wherein the use case comprises at least one of an industrial wireless sensor, a video surveillance or a wearable device, or
a duplex mode of the wireless terminal.

11. The wireless communication method of claim 9, wherein the final TBS is smaller than or equal to a maximum TBS,
wherein the maximum TBS is determined based on the plurality of transmission parameters,
wherein the plurality of transmission parameters includes at least one of a maximum code block size, a maximum code rate supported by the wireless terminal, a maximum code rate of a modulation and coding scheme (MCS) table, a maximum modulation order supported by the wireless terminal and a maximum modulation order of the MCS table,
wherein the maximum TBS is:
one of elements in a TBS table which is greater than or equal to a product of the maximum code block size and a ratio of the maximum code rate supported by the wireless terminal and the maximum code rate in a configurable MCS table, wherein the ratio of the maximum code rate supported by the wireless terminal and the maximum code rate in the configurable MCS table is a value in a range [0.27, 0.7201], and wherein the maximum code block size is equal to 3840 for low-density parity-check (LDPC) base graph 2 and is 8448 for LDPC base graph 1, or
one of elements in a TBS table which is greater than or equal to a product of the maximum code block size and a ratio of the maximum modulation order supported by the wireless terminal and the maximum modulation order in a configurable MCS table, wherein the ratio of the maximum modulation order supported by the wireless terminal and the maximum modulation order in the configurable MCS table is a value in a range [0.25, 1], and wherein the maximum code block size is equal to 3840 for LDPC base graph 2 and 8448 for LDPC base graph 1.

12. The wireless communication method of claim 9, wherein the final TBS is smaller than or equal to a maximum TBS,
wherein the maximum TBS for a first type of a transmission mode comprises at least one element in a first TBS set and the maximum TBS for a second type of the transmission mode comprises at least one element in a second TBS set,
wherein the transport block is transmitted in:
a physical downlink shared channel, wherein the first TBS set comprises at least one of {1000, 1736, 3752, 3824, 3840, 4008, 5160, 8424, 27376, 51240},
a physical uplink shared channel, wherein the first TBS set comprises at least one of {328, 408, 456, 504, 600, 712, 808, 936, 1000, 1736, 3752, 3824, 3840, 4008, 5160, 8424},
a physical downlink shared channel, wherein the second TBS set comprises at least one of {8424, 15110, 15370, 15620, 15880, 16140, 27376, 50180, 51220}, or
a physical uplink shared channel, wherein the second TBS set comprises at least one of {3824, 5160, 8424, 25100, 27376}, and
wherein a value of any element in the first TBS set is:
smaller than or equal to 5160 and a value of any element in the second TBS set is smaller than or equal to 8848, or smaller than or equal to 3840 and a value of any element in the second TBS set is smaller than or equal to 3840.

13. The wireless communication method of claim 9, wherein the wireless terminal supports low-density parity-check (LDPC) base graph 2, and
wherein the intermediate TBS or the final TBS is smaller than or equal to 3824.

14. The wireless communication method of claim 9, wherein the at least one event comprises at least one of the intermediate TBS is greater than 3824, the wireless terminal supports low-density parity-check (LDPC) based graph 2, the type of RNTI scrambling a cyclic redundancy check (CRC) of downlink control information (DCI) is a radio network temporary identifier (RNTI) other than the RNTI in Rel-16 NR, or the type of transmission mode is a first type of transmission mode including a maximum modulation order smaller than or equal to 64 quadrature amplitude modulation (QAM),
wherein the specific step comprises using a TBS table to determine a closest TBS that is greater than or equal to the modified TBS,
wherein each element in the TBS table is different from all of the elements in TBS table in Rel-16 NR, and
wherein each element in the TBS table is divisible by 3816 and a quotient of the element divided by 3816 is larger than 1,
wherein the final TBS is determined by:

$$\text{final } TBS = 8 \cdot C \left\lceil \frac{N'_{info} + 24}{8 \cdot C} \right\rceil,$$

wherein C is determined by $$\left\lceil \frac{N'_{info} + 24}{3816} \right\rceil,$$

wherein $\lceil\ \rceil$ is a ceiling function, $N'_{info}$ is the modified TBS and is determined by:

$$N'_{info} = \max\left(3840, 2^n \times \text{round}\left(\frac{N_{info} - 24}{2^n}\right)\right),$$

wherein max( ) is a function of acquiring the maximum variable, round ( ) is a function of rounding a variable to the closest integer, $N_{info}$ is the intermediate TBS and n is determined by:

$$n = \lfloor \log_2(N_{info} - 24) \rfloor - 5,$$

wherein $\lfloor\ \rfloor$ is a bottom function.

15. The wireless communication method of claim 9, wherein a modulation and coding scheme (MCS) table with transform precoding is used for transmitting the transport block, and
wherein the wireless terminal is configured with a type of transmission mode which is associated with at least one of:
a type of a radio network temporary identifier scrambling a cyclic redundancy check of downlink control information,
a peak data rate for uplink and/or downlink,
a battery life of the wireless terminal,
a modulation order supported by the wireless terminal,
a maximum code rate,
a maximum TBS supported by the wireless terminal,
a maximum number of PRBs associated with a bandwidth configured for a bandwidth part of the wireless terminal,
a target block error rate of transmitting the transport block,
an end-to-end latency supported by the wireless terminal,
a type of frequency range supported by the wireless terminal,
a coverage enhancement capability of the wireless terminal,
a power class of the wireless terminal,
a processing time capability of the wireless terminal,
a use case of the wireless terminal, wherein the use case comprises at least one of an industrial wireless sensor, a video surveillance or a wearable device, or
a duplex mode supported by the wireless terminal.

16. The wireless communication method of claim 9, wherein a buffer size for low-density parity-check (LDPC) rate matching is determined by a higher layer signaling comprising at least one of:
a maximum bandwidth supported by the wireless terminal,
a number of physical resource blocks available for the wireless terminal in a bandwidth supported by the wireless terminal,
a maximum number of layers supported by the wireless terminal,
a peak data rate supported by the wireless terminal,
a maximum modulation order supported by the wireless terminal,
a bandwidth part activated for the wireless terminal, or
a type of a radio network temporary identifier scrambling cyclic redundancy check of downlink control information.

17. A wireless terminal, comprising a processor configured to:
receive, from a wireless network node, a signal indicating a plurality of transmission parameters,
determine an intermediate transport block size (TBS) for a transport block transmitted between the wireless terminal and the wireless network node based on the plurality of transmission parameters,
modify the intermediate TBS to generate a modified TBS in response to at least one event, and
determine a final TBS based on the modified TBS and a specific step in response to the at least one event,
wherein the specific step is determined based on the plurality of transmission parameters,
wherein the plurality of transmission parameters comprises a type of a transmission mode configured for the wireless terminal, and wherein the transmission mode is determined based on one of a user equipment (UE) capability and a UE category,
wherein a number of physical resource blocks (PRBs) in the signal is quantized by a scaling factor which is associated with a bandwidth of a bandwidth part of the wireless terminal.

18. A wireless network node, comprising:
a communication unit, configured to transmit, to a wireless terminal, a signal indicating a plurality of transmission parameters, and
a processor, configured to:
determine an intermediate transport block size (TBS) for a transport block transmitted between the wireless terminal and the wireless network node based on the plurality of transmission parameters, modify the intermediate TBS to generate a modified TBS in response to at least one event, and determine a final TBS based on the modified TBS and a specific step in response to the at least one event, and wherein the specific step is determined based on the plurality of transmission parameters, wherein the plurality of transmission parameters comprises a type of a transmission mode configured for the wireless terminal, and wherein the transmission mode is determined based on one of a user equipment (UE) capability and a UE category, wherein a number of physical resource blocks (PRBs) in the signal is quantized by a scaling factor which is associated with a bandwidth of a bandwidth part of the wireless terminal.

* * * * *